(12) United States Patent
Noh et al.

(10) Patent No.: US 11,416,114 B2
(45) Date of Patent: Aug. 16, 2022

(54) MOBILE TERMINAL AND CONTROL METHOD THEREFOR

(71) Applicant: LG ELECTRONICS INC., Seoul (KR)

(72) Inventors: Kensin Noh, Seoul (KR); Dongwan Kang, Seoul (KR); Seungyong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/033,519

(22) Filed: Sep. 25, 2020

(65) Prior Publication Data

US 2022/0019336 A1 Jan. 20, 2022

(30) Foreign Application Priority Data

Jul. 15, 2020 (WO) ................ PCT/KR2020/009277

(51) Int. Cl.
*G06F 3/04886* (2022.01)
*G06F 3/04817* (2022.01)
(Continued)

(52) U.S. Cl.
CPC ...... *G06F 3/04817* (2013.01); *G06F 3/04842* (2013.01); *G06F 3/04845* (2013.01); *G06F 3/04886* (2013.01); *G06F 2203/04803* (2013.01)

(58) Field of Classification Search
CPC .............. G06F 3/04845; G06F 3/04886; G06F 2203/04803; G06F 1/1624; G06F 1/1652
See application file for complete search history.

(56) References Cited

U.S. PATENT DOCUMENTS 10,198,178 B2 * 2/2019 Sato ...................... G06F 3/0481
10,742,784 B1 * 8/2020 Jo ........................ H04M 1/0239
(Continued)

FOREIGN PATENT DOCUMENTS

EP          3073362       9/2016
KR     1020170038308     4/2017
(Continued)

OTHER PUBLICATIONS

European Patent Office Application Serial No. 20214131.3, Search Report dated Jun. 25, 2021, 10 pages.
(Continued)

*Primary Examiner* — Ryan F Pitaro
(74) *Attorney, Agent, or Firm* — Lee, Hong, Degerman, Kang & Waimey PC

(57) ABSTRACT

A mobile terminal and a control method therefor are disclosed. The mobile terminal includes a body, an input unit configured to receive user input, a display coupled to the body to vary a display region viewed from a front face of the body according to switching between an enlarged display mode and a reduced display mode, and a controller. The controller receives a first signal in a state in which at least two applications are being executed in split regions of the display, controls output of an icon according to the first signal, controls selection of at least one region among the split regions based on a second signal for the icon, and controls a function of an application which is being executed in a selected region based on a third signal for the icon.

18 Claims, 22 Drawing Sheets

(51) Int. Cl.
    *G06F 3/04842*       (2022.01)
    *G06F 3/04845*       (2022.01)

(56) References Cited

U.S. PATENT DOCUMENTS

| | | | |
|---|---|---|---|
| 10,754,711 B2* | 8/2020 | Hong | G06F 9/542 |
| 10,963,016 B1* | 3/2021 | Oh | G06F 1/1626 |
| 2008/0158189 A1* | 7/2008 | Kim | H04M 1/72469 |
| | | | 345/173 |
| 2008/0238880 A1* | 10/2008 | Miwa | G06F 3/04886 |
| | | | 345/173 |
| 2010/0088634 A1* | 4/2010 | Tsuruta | G09G 5/14 |
| | | | 715/800 |
| 2010/0138767 A1* | 6/2010 | Wang | G06F 3/0481 |
| | | | 715/769 |
| 2010/0174987 A1* | 7/2010 | Shin | G06F 3/04847 |
| | | | 715/702 |
| 2012/0133604 A1* | 5/2012 | Ishizuka | G06F 3/0486 |
| | | | 345/173 |
| 2013/0201208 A1* | 8/2013 | Cho | G06F 3/0488 |
| | | | 345/619 |
| 2014/0002471 A1* | 1/2014 | Yeo | H04N 21/4126 |
| | | | 345/581 |
| 2014/0132531 A1* | 5/2014 | Lee | G06F 3/04847 |
| | | | 345/173 |
| 2014/0164990 A1* | 6/2014 | Kim | G06F 3/0488 |
| | | | 715/790 |
| 2014/0176421 A1* | 6/2014 | Chen | G06F 1/1652 |
| | | | 345/156 |
| 2014/0380186 A1* | 12/2014 | Kim | G06F 1/1624 |
| | | | 715/746 |
| 2015/0130737 A1* | 5/2015 | Im | G06F 3/04886 |
| | | | 345/173 |
| 2015/0205511 A1* | 7/2015 | Vinna | G06F 3/0481 |
| | | | 715/716 |
| 2015/0294627 A1* | 10/2015 | Yoo | H04M 1/72454 |
| | | | 345/690 |
| 2015/0331593 A1* | 11/2015 | Lee | G06F 1/1641 |
| | | | 345/667 |
| 2016/0048316 A1* | 2/2016 | Bae | G06F 1/1626 |
| | | | 715/800 |
| 2016/0110010 A1* | 4/2016 | Lee | G06F 1/1643 |
| | | | 345/173 |
| 2016/0132074 A1* | 5/2016 | Kim | G06F 1/1652 |
| | | | 715/769 |
| 2016/0196057 A1* | 7/2016 | Choi | G06F 3/04845 |
| | | | 715/773 |
| 2016/0202852 A1* | 7/2016 | Park | G06F 3/04842 |
| | | | 715/781 |
| 2016/0378270 A1* | 12/2016 | Lee | G06F 3/0481 |
| | | | 715/788 |
| 2017/0075640 A1 | 3/2017 | Chun et al. | |
| 2017/0329467 A1* | 11/2017 | Chen | H04L 51/32 |
| 2018/0321843 A1* | 11/2018 | Giannotti | G06F 3/04886 |
| 2019/0272091 A1 | 9/2019 | Seo et al. | |
| 2019/0346954 A1* | 11/2019 | Jung | G06F 1/3209 |
| 2020/0034012 A1* | 1/2020 | Kang | H04M 1/0214 |
| 2020/0081608 A1* | 3/2020 | Yamamoto | G06F 3/04883 |
| 2020/0133482 A1* | 4/2020 | Kim | G06F 3/04886 |
| 2020/0228716 A1* | 7/2020 | Abe | G09G 5/14 |
| 2020/0337159 A1* | 10/2020 | Yang | G06F 1/1624 |
| 2022/0104369 A1* | 3/2022 | Yao | H01L 51/5237 |

FOREIGN PATENT DOCUMENTS

| | | |
|---|---|---|
| KR | 1020190001389 | 1/2019 |
| KR | 1020190141518 | 12/2019 |

OTHER PUBLICATIONS

PCT International Application No. PCT/KR2020/009277, International Search Report dated Apr. 14, 2021, 11 pages.

* cited by examiner

FIG. 6
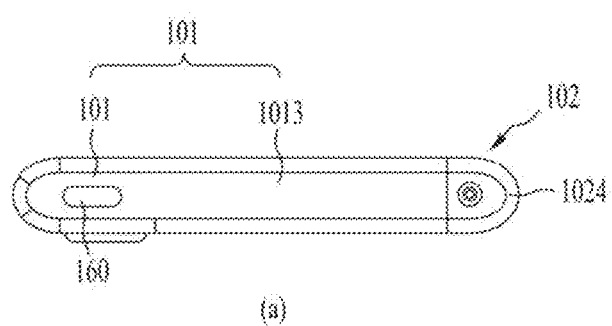
(a)
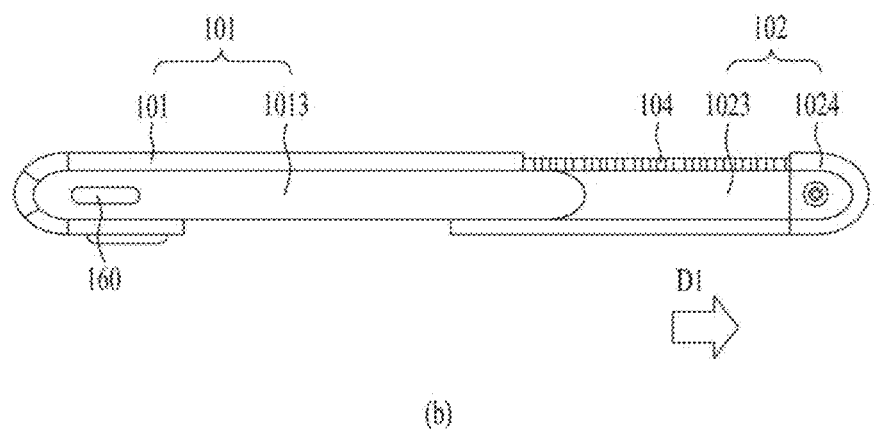
(b)

FIG. 7
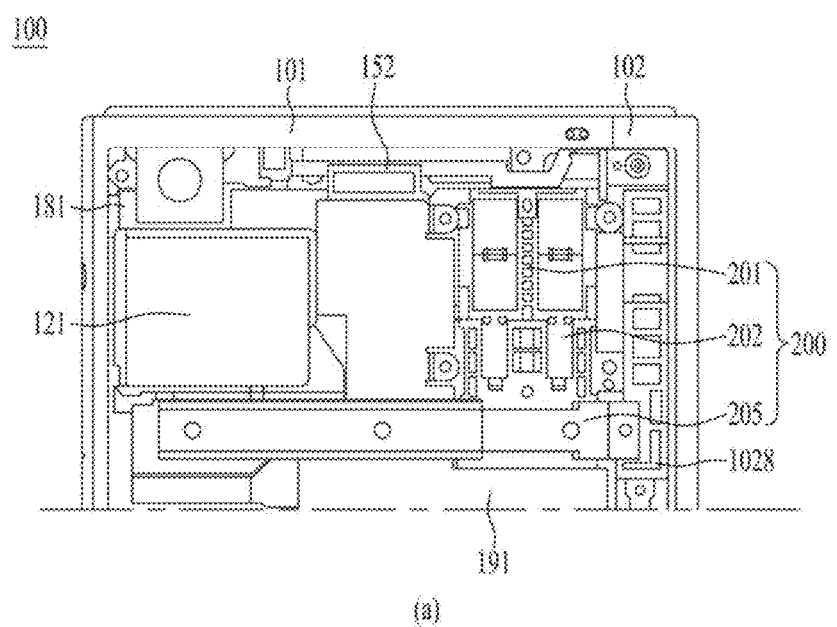
(a)
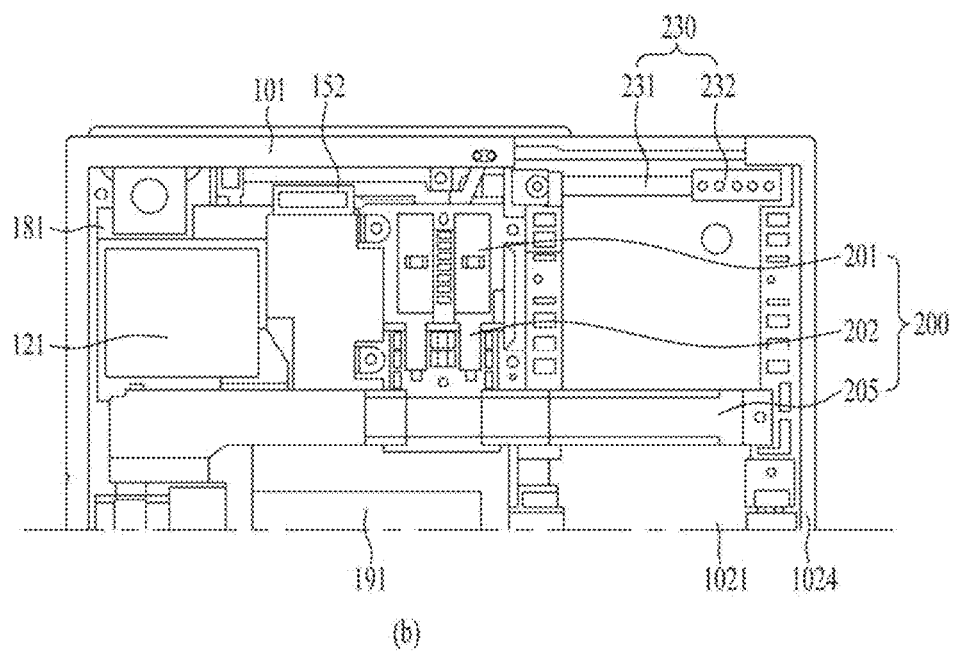
(b)

FIG. 8
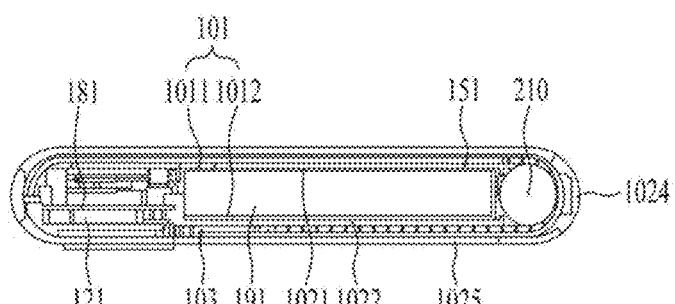
(a)
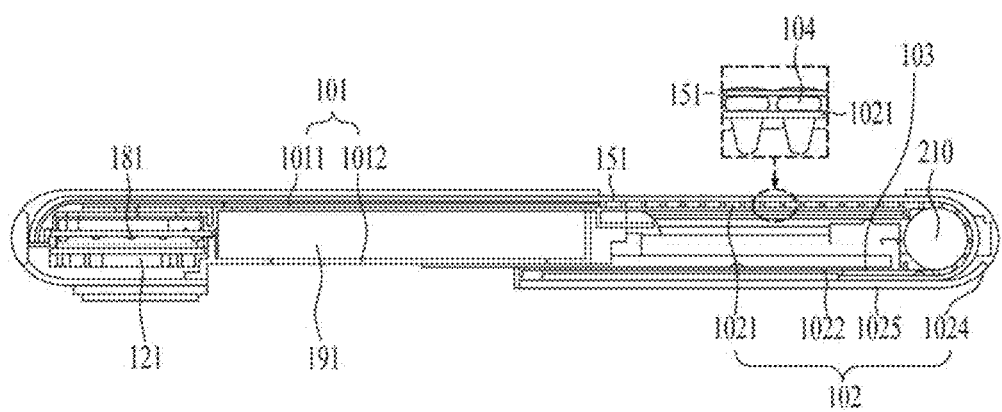
(b)

(a)  (b)

FIG. 11
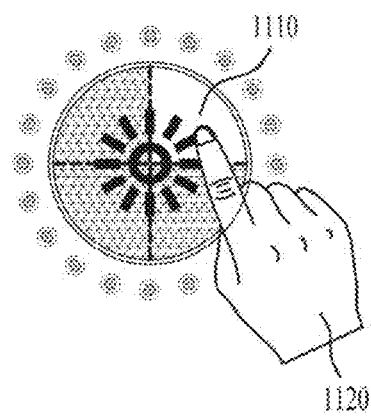
(a)
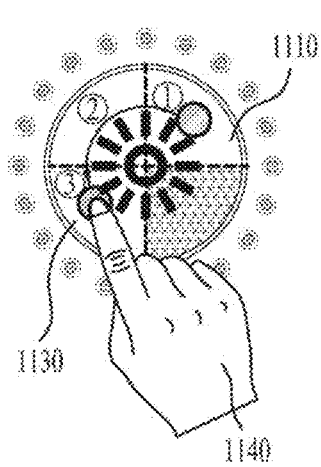
(b)

MOBILE TERMINAL AND CONTROL METHOD THEREFOR

CROSS-REFERENCE TO RELATED APPLICATION(S)

Pursuant to 35 U.S.C. § 119 (a), this application claims the benefit of an earlier filing date and right of priority to International Application No. PCT/KR2020/009277 filed on Jul. 15, 2020, the contents of which are hereby incorporated by reference herein in its entirety.

BACKGROUND

Field

The present disclosure relates to a mobile terminal and a control method therefor. More specifically, the present disclosure relates to a mobile terminal for controlling a function of an application which is being executed in a selected region based on a signal for an icon in a state in which at least two applications are being executed in split regions of a display, and a control method therefor.

Discussion of the Related Art

Terminals may be classified into mobile/portable terminals or stationary terminals according to mobility thereof. Mobile terminals may also be classified into handheld terminals or vehicle mounted terminals according to whether or not a user can directly carry the terminal.

Functions of mobile terminals are diversifying. For example, the functions include data and voice communication, photography and video capture using a camera, voice recording, music file playback through a speaker system, and image or video output on a display. Some terminals additionally have an electronic gaming function or perform multimedia player functions. Particularly, recent mobile terminals may receive multicast signals that provide visual content such as broadcast, video, or television programs.

As functions of such terminals are diversified, the terminals are implemented in the form of a multimedia player equipped with composite functions such as photograph or video capture, music or video file playback, and broadcast reception.

To support and increase the functions of the terminals, improvement of a structural part and/or software part of the terminals may be considered.

Recently, a flexible display having sufficient elasticity and capable of large deformation has been developed. The size of the display of a mobile terminal may be varied using the deformable nature of the flexible display.

In particular, although technology using a mobile terminal by splitting a screen of the mobile terminal has been developed with the emergence of an extended display, there are not many embodiments capable of individually controlling split regions.

Additionally, when the screen is split into multiple display regions, there is inconvenience of controlling setting of desired regions one by one.

SUMMARY

An object of the present disclosure is to solve the above and other problems.

An object of the present disclosure is to provide a mobile terminal for controlling a function of an application which is being executed in a selected region based on a signal for an icon in a state in which at least two applications are being executed in split regions of a display, and a control method therefor.

To achieve these objects and other advantages and in accordance with the purpose of the disclosure, as embodied and broadly described herein, a mobile terminal includes a body, an input unit configured to receive user input, a display coupled to the body to vary a display region viewed from a front face of the body according to switching between an enlarged display mode and a reduced display mode, and a controller. The controller receives a first signal in a state in which at least two applications are being executed in split regions of the display, controls output of an icon according to the first signal, controls selection of at least one region among the split regions based on a second signal for the icon, and controls a function of an application which is being executed in a selected region based on a third signal for the icon.

According to an aspect of the present disclosure, the controller may determine the selected region among the split regions based on the second signal, and control the display to distinguishably output the selected region and remaining regions except for the selected region.

According to an aspect of the present disclosure, the controller may control a function of a first application which is being executed in a first region based on the third signal when the selected region is the first region.

According to an aspect of the present disclosure, the third signal may be a signal of touching or touching and dragging a dial indicator output together with the icon.

According to an aspect of the present disclosure, the function may include at least one of a brightness adjustment function, a screen on/off switching function, a resolution adjustment function, a frames-per-second (FPS) adjustment function, or a system resource distribution function.

According to an aspect of the present disclosure, the controller may control output of a function indicator associated with the controlled function inside the icon.

According to an aspect of the present disclosure, the controller may control change of a function controlled by the icon based on a fourth signal for the icon.

According to an aspect of the present disclosure, the controller may control output of a line indicator for distinguishing between the split regions inside the icon.

According to an aspect of the present disclosure, the second signal may be a signal for selecting the line indicator and the controller may determine a region adjacent to the line indicator as the selected region based on the second signal.

According to an aspect of the present disclosure, when the selected region includes two or more regions, the controller may simultaneously control functions of applications which are being executed in the two or more regions based on the third signal.

According to an aspect of the present disclosure, the controller may control output of a numerical value associated with the controlled function inside the icon.

According to an aspect of the present disclosure, the controller may control output of a numerical value associated with the controlled function on the application, the function of which is controlled.

According to an aspect of the present disclosure, the controller may control end of output of the numerical value after a preset time elapses after the numerical value is output.

According to an aspect of the present disclosure, when the selected region is determined based on the second signal, the controller may control output of an equal visual effect in the selected region and in an inner region of the icon corresponding to the selected region.

According to an aspect of the present disclosure, the icon may be output in a preset region of the display.

According to an aspect of the present disclosure, the controller may control end of output of the icon when the second signal is not received within a preset time after the icon is output.

According to an aspect of the present disclosure, the body may include a first frame and a second frame and the second frame may be extendable or contractible from the first frame. The controller may operate in the enlarged display mode based on extension of the second frame and operates in the reduced display mode based on contraction of the second frame.

According to an aspect of the present disclosure, the display may include a flexible display surrounding the front face, a side face, and a rear face of the body. The controller may control the display to move a display portion positioned on the side face of the body to the front face of the body and to move a display portion positioned on the rear face of the body to the front face of the body via the side face of the body, based on extension of the second frame, and control the display to move a display portion positioned on the front face of the body to the side face of the body or to the rear face of the body via the side face of the body, based on contraction of the second frame.

According to an aspect of the present disclosure, the mobile terminal may further include a driving unit configured to extend or contract the second frame.

According to an aspect of the present disclosure, provided herein is a method of controlling a mobile terminal including a display coupled to a body to vary a display region viewed from a front face of the body according to switching between an enlarged display mode and a reduced display mode. The method includes receiving a first signal in a state in which at least two applications are being executed in split regions of the display, outputting an icon according to the first signal, selecting at least one region among the split regions based on a second signal for the icon, and controlling a function of an application which is being executed in a selected region based on a third signal for the icon.

Further scopes of applicability of the present disclosure will become apparent from the following detailed description. However, those skilled in the art may understand that various modifications and changes may be possible within the concept and scope of the present disclosure and the detailed description and specific examples, such as exemplary embodiments of the disclosure, will be given by way of illustration only.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 6 is a side view of the mobile terminal as viewed from a third direction;

FIG. 7 is a view showing a driving unit of the mobile terminal in accordance with an embodiment;

FIG. 8 is a cross-sectional view taken along lines A-A and B-B in FIG. 2;

FIG. 11 is a diagram illustrating an embodiment of selecting a region in an icon according to an embodiment of the present disclosure;

DETAILED DESCRIPTION OF THE DISCLOSURE

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element may be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
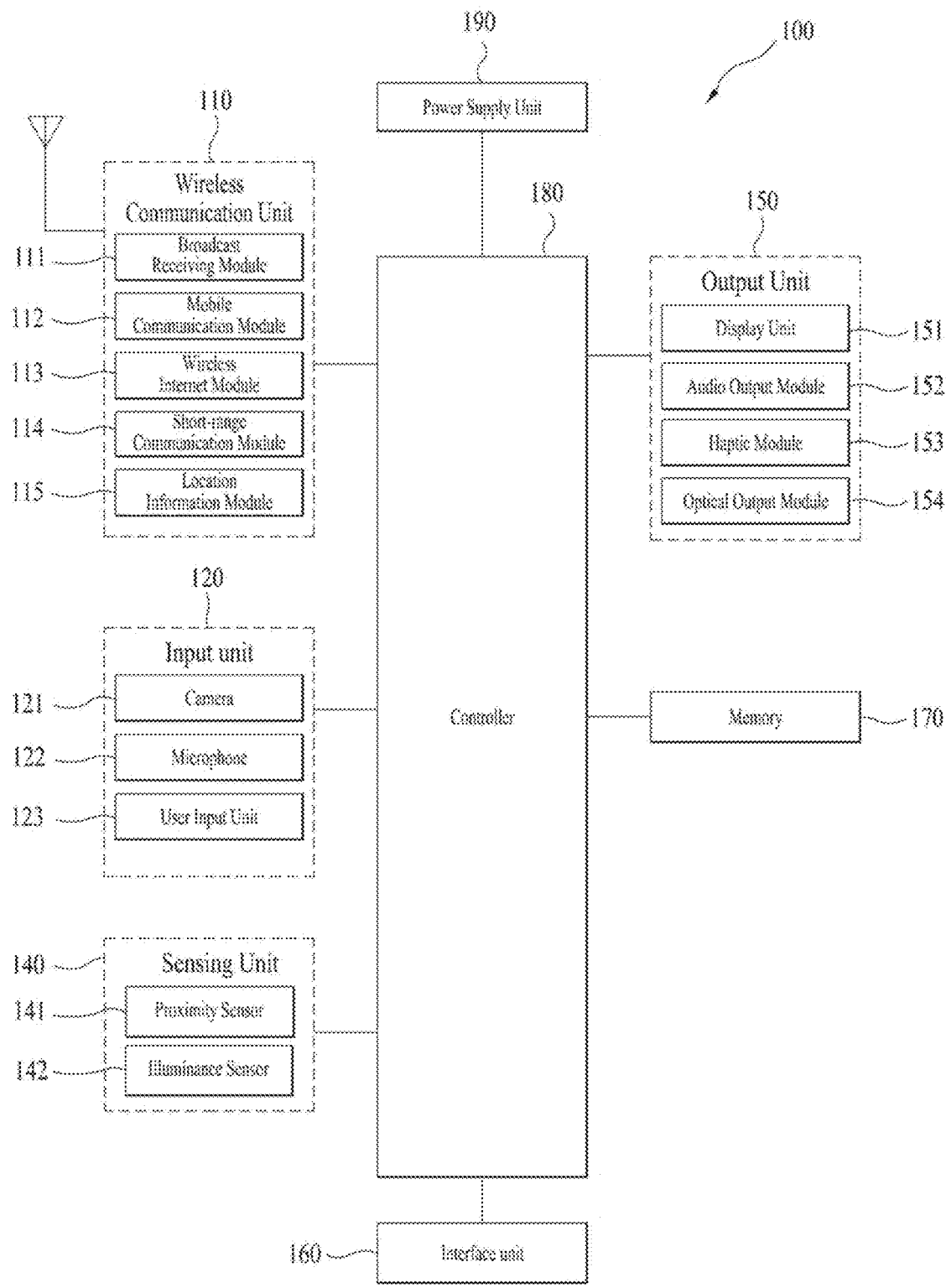
FIG. 1 is a block diagram of a mobile terminal in accordance with the present disclosure.

FIG. 1 is a block diagram of a mobile terminal in accordance with the present disclosure.

The mobile terminal 100 is shown having components such as a wireless communication unit 110, an input unit 120, a sensing unit 140, an output unit 150, an interface unit 160, a memory 170, a controller 180, and a power supply unit 190. Referring now to FIG. 1, the mobile terminal 100 is shown having wireless communication unit 110 configured with several commonly implemented components. It is understood that implementing all of the illustrated components is not a requirement, and that greater or fewer components may alternatively be implemented.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 may transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include Bluetooth™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless Universal Serial Bus (USB), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area network.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal may be acquired based on information related to a wireless access point (AP) which transmits or receives a wireless signal to or from the Wi-Fi module.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

Such cameras 121 may process image frames of still pictures or video obtained by image sensors in a video or image capture mode. The processed image frames may be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input may be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 may provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 may be configured to generate various tactile effects that a user feels, perceive, or otherwise experience. A typical example of a tactile effect generated by the haptic module 153 is vibration. The strength, pattern and the like of the vibration generated by the haptic module 153 may be controlled by user selection or setting by the controller. For example, the haptic module 153 may output different vibrations in a combining manner or a sequential manner.

An optical output module 154 may output a signal for indicating an event generation using light of a light source. Examples of events generated in the mobile terminal 100 may include message reception, call signal reception, a missed call, an alarm, a schedule notice, an email reception, information reception through an application, and the like.

The interface unit 160 serves as an interface with various types of external devices that may be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output, or activating application programs stored in the memory 170.

To drive the application programs stored in the memory 170, the controller 180 may be implemented to control a predetermined number of the components mentioned above in reference with FIG. 1. Moreover, the controller 180 may be implemented to combinedly operate two or more of the components provided in the mobile terminal 100 to drive the application programs.

The power supply unit 190 may be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

Figure 2:
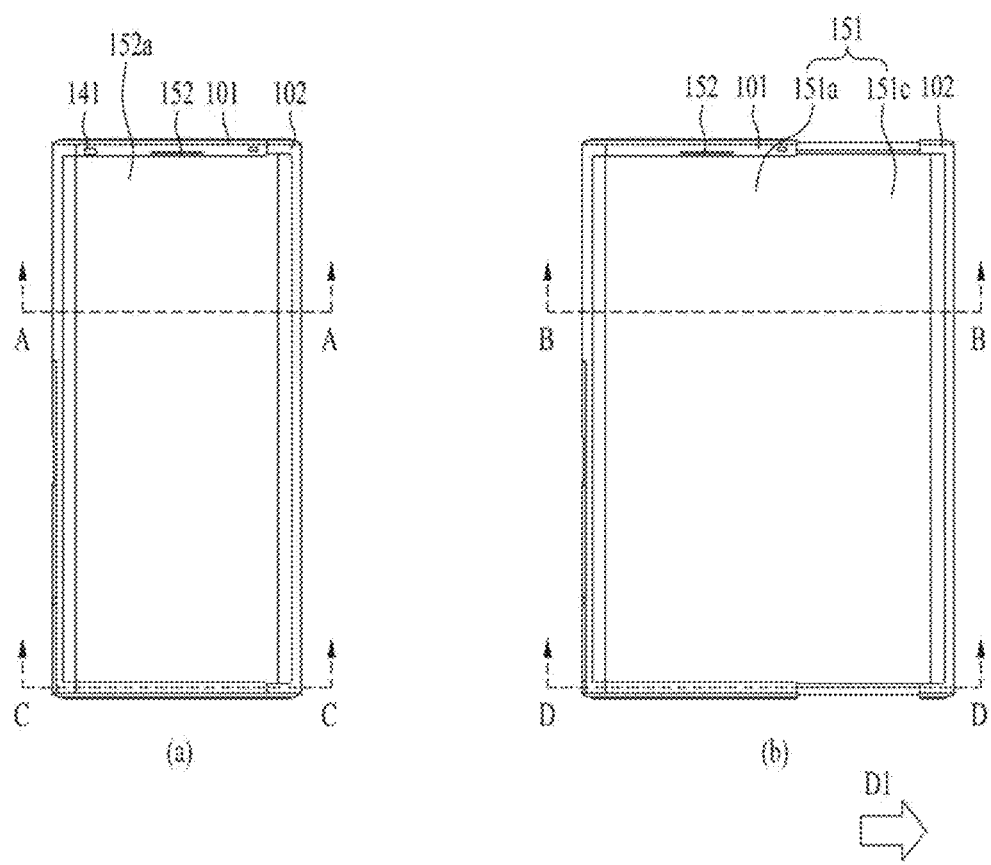
FIG. 2 is a front view of a first state and a second state of the mobile terminal in accordance with an embodiment.
Figure 3:
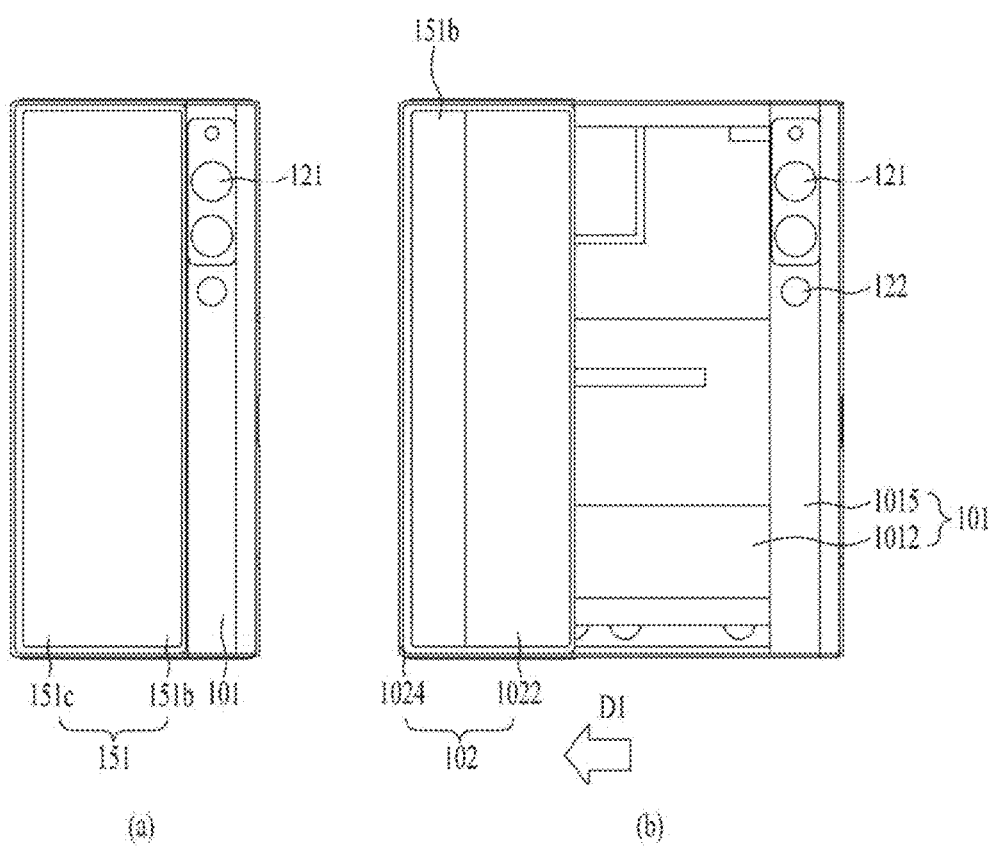
FIG. 3 is a rear view of the first state and the second state of the mobile terminal in accordance with an embodiment.

FIG. 2 is a front view of a first state and a second state of the mobile terminal in accordance with an embodiment, and FIG. 3 is a rear view of the first state and the second state of the mobile terminal in accordance with an embodiment. FIGS. 2(a) and 3(a) are views showing the first state in which the mobile terminal is contracted, and FIGS. 2(b) and 3(b) are views showing the second state in which the mobile terminal is extended.

As shown in the figures, the mobile terminal 100 in the first state is in a contracted position, and has a smaller size than the mobile terminal 100 in the second state. In addition, the size of the display unit 151 positioned on the front of the mobile terminal 100 is also smaller than in the second state. The mobile terminal 100 in the first state may be extended in a first direction D1 to switch to the second state. In the second state, as shown in FIG. 2(b), the size of the mobile terminal 100 and the size of the display unit 151 positioned on the front of the mobile terminal 100 are larger than in the first state, while the size of the display unit 151 positioned on the rear of the mobile terminal 100 is reduced as shown in FIG. 3(b). That is, a part of the display units 151 positioned on the rear of the mobile terminal 151 in the first state moves to the front of the mobile terminal 100 in the second state.

In the following description, the direction in which the mobile terminal 100 and the display unit 151 thereof are extended or enlarged is defined as a first direction D1, and the direction in which the mobile terminal contracts or retracts or is reduced to switch from the second state to the first state is defined as a second direction D2. A direction perpendicular to the first and second directions D1 and D2 is defined as a third direction. Description will be made on the assumption that the first and second directions are horizontal directions and the third direction is a vertical direction. However, depending on the arrangement of the mobile terminal 100, the first and second directions may be vertical directions and the third direction may be a horizontal direction.

As such, a flexible display unit 151 which is bendable may be used as the display unit such that the position of the display unit may be varied. The flexible display unit 151 may be a display unit capable of maintaining a flat state like a conventional flat panel display and capable of warping, bending, folding, twisting, or rolling like paper. The flexible display unit 151 refers to a display which is manufactured on a thin and flexible substrate and is thus lightweight and robust as not to be easily broken. The flexible display unit according the present disclosure may be bent in a specific direction, and may be arranged such that the curvature thereof may change in the first direction.

In addition, an electronic paper is a display technology to which properties of general ink are applied. The electronic paper may be different from the conventional flat panel display in using reflected light. The electronic paper may change information using a twisted ball or electrophoresis using a capsule.

In a state in which the flexible display unit 151 is not deformed (e.g., a state of having an infinite curvature radius, hereinafter referred to as a basic state), a display region of the flexible display unit 151 becomes flat. In a state in which the flexible display unit 151 is deformed by an external force from the basic state (e.g., a state of having a finite radius of curvature, hereinafter referred to as a deformed state), the display region may become a curved face. As shown, information displayed in the deformation state may be visual information output on the curved face. Such visual information is implemented by independently controlling light emission of sub-pixels arranged in a matrix. The sub-pixel refers to a minimum unit for implementing one color. When external force is applied to the flexible display unit 151, the flexible display unit 151 may be deformed to switch from the default state, which is the flat state, to a bent state, which is not the flat state.

The flexible display unit 151 may be combined with a touch sensor to implement a flexible touch screen. When a touch is made on the flexible touch screen, the controller 180 (see FIG. 1) may perform control corresponding to such touch input. The flexible touch screen may be configured to detect the touch input in the deformed state as well as in the basic state.

The touch sensor detects the touch (or touch input) applied on the touch screen using at least one of various touch schemes such as a resistive film scheme, a capacitance scheme, an infrared scheme, an ultrasonic wave scheme, a magnetic field scheme, and the like.

As an example, the touch sensor may be configured to convert a change in pressure applied on a specific portion of the touch screen, capacitance generated at the specific portion, or the like into an electrical input signal. The touch sensor may be configured such that a touch object applying a touch on the touch screen may detect touched position and region on the touch sensor, a pressure during the touch, a capacitance during the touch, and the like.

Further, the mobile terminal 100 may have a deformation detection means for detecting the deformation of the flexible display unit 151. Such deformation detection means may be included in the sensing unit 140 (see FIG. 1).

The deformation detection means may be disposed in the flexible display unit 151 or a case (first to second frames 101 to 102 to be described later) to detect information related to the deformation of the flexible display unit 151. In this connection, the information related to the deformation may include a direction in which the flexible display unit 151 is deformed, a degree of the deformation, a deformed position, a deformed time, an acceleration at which the deformed flexible display unit 151 is restored, and the like. In addition, the information related to the deformation may include various kinds of information that may be detected due to the bending of the flexible display unit 151.

In addition, the controller 180 may change information displayed on the flexible display unit 151 or generate a control signal for controlling a function of the mobile terminal 100 based on the information related to the deformation of the flexible display unit 151 detected by the deformation detection means.

The deformation of the flexible display unit 151 may vary depending on the positions of the first frame 101 and the second frame 102. As shown in FIG. 2, since the bending position on the flexible display unit 151 is determined according to the positions of the first frame and the second frame, the bending deformation position of the flexible display unit 151 and the region thereof positioned on the front may be calculated based on the positions of the first frame 101 and the second frame 102 in place of the deformation detection means of the flexible display unit 151.

The state conversion (first or second state) of the flexible display unit 151, i.e., the size change at the front and rear faces of the mobile terminal 100 of the display unit 151 based on the size change of the mobile terminal 100 may be performed manually by a force applied by the user, but may be not limited to such manual scheme. For example, when the mobile terminal 100 or the flexible display unit 151 is in the first state, the mobile terminal 100 or the flexible display unit 151 may be converted into the second state by the user or an application command without the external force applied by the user. As such, in order for the flexible display unit 151 to be automatically deformed without the external force, the mobile terminal 100 may include a driving unit 200, which will be described later.

The flexible display unit 151 of the present disclosure is bent 180 degrees by rolling around a side portion of the mobile terminal 100 facing in the first direction. Accordingly, based on the side portion of the mobile terminal 100, a part of the flexible display unit 151 is disposed on the front of the mobile terminal 100, and the other part of the flexible display unit 151 is disposed on the rear of the mobile terminal 100. For simplicity, the part of the flexible display unit 151 positioned on the front is called a front face, and the other part of the flexible display unit 151 positioned on the rear is called a rear face. As illustrated in FIG. 2, the mobile terminal may extend in the first direction or contract in the second direction opposite to the first direction. In this case, the region of the flexible display unit 151 positioned on the front changes. That is, the sizes of the front face and the rear face may be changed according to a change in the state of the mobile terminal.

The part of the flexible display unit 151 positioned on the front of the mobile terminal 100 may be immovably fixed to the front surface of the first frame 101, and the other part thereof positioned on the rear of the mobile terminal 100 may be movably arranged on the rear of the mobile terminal 100.

In addition, the flexible display unit 151 may be rolled on or released at the side portion in the first direction of mobile terminal. Accordingly, the rear face of the display unit 151 moves, so that the size of the front face of the display unit 151 may be adjusted. Since the size of the flexible display unit 151 is determined and the flexible display unit 151 is formed of one continuous body, a region of rear face of the display unit 151 decreases as a region of the front face of the display unit 151 increases. Such a display unit 151 may be rolled in a second frame 102, which is movable relative to a first frame 101 to be described later, more correctly, on one of sides of the second frame 102. The display unit 151 may be withdrawn or pulled out from or inserted or pushed into the second frame 102 while being rolled in the second frame 102 along a moving direction of the second frame 102 to adjust the region of the display unit 151 on the front face of the mobile terminal 100. Such operation will be described in more detail below along with other relevant components of the mobile terminal 100.

Typically, an antenna is disposed in the case or the housing of the mobile terminal 100, but a portion where the antenna is installed in the case or the housing may be limited because of the flexible display unit 151 that covers not only the front face of the mobile terminal 100 but also the rear face thereof. For this reason, the antenna may be implemented on the flexible display unit 151. An antenna on display (AOD) is an antenna in which a transparent film is formed by stacking an electrode layer and a dielectric layer that have patterns engraved thereon, respectively. The antenna on display may be implemented thinner than an antenna implemented using a laser direct structuring (LDS) technology using a conventional copper nickel plating scheme, so that the antenna on display may not be exposed to the outside without affecting a thickness. In addition, the antenna on display may transmit and receive a signal directly to or from the display unit 151. Accordingly, the antenna on display may be used in the mobile terminal 100 in which the display unit 151 is located on the both faces of the mobile terminal 100 as in the present disclosure.

Figure 4:
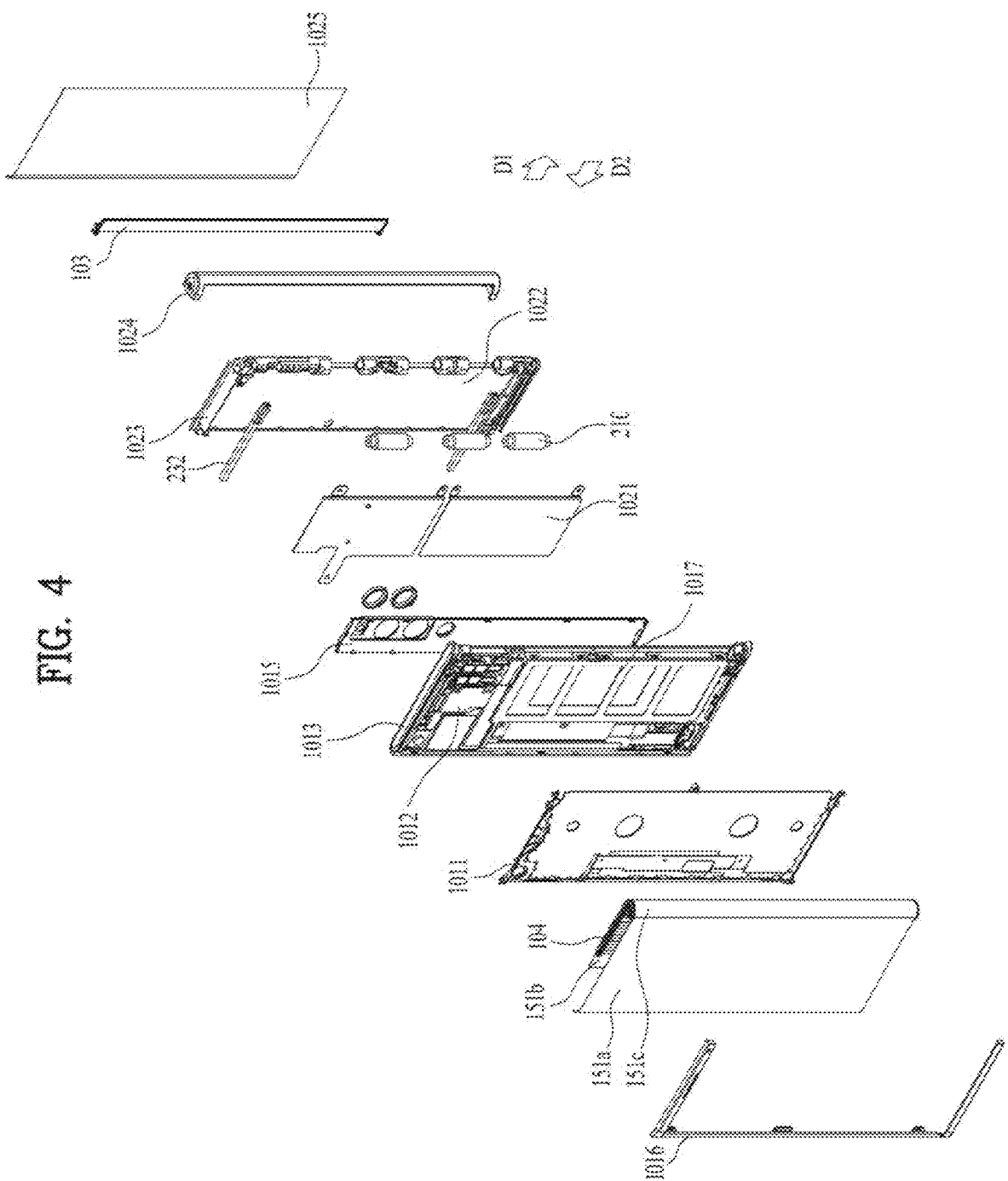
FIGS. 4 and 5 are exploded perspective views of the mobile terminal in accordance with an embodiment.
Figure 5:
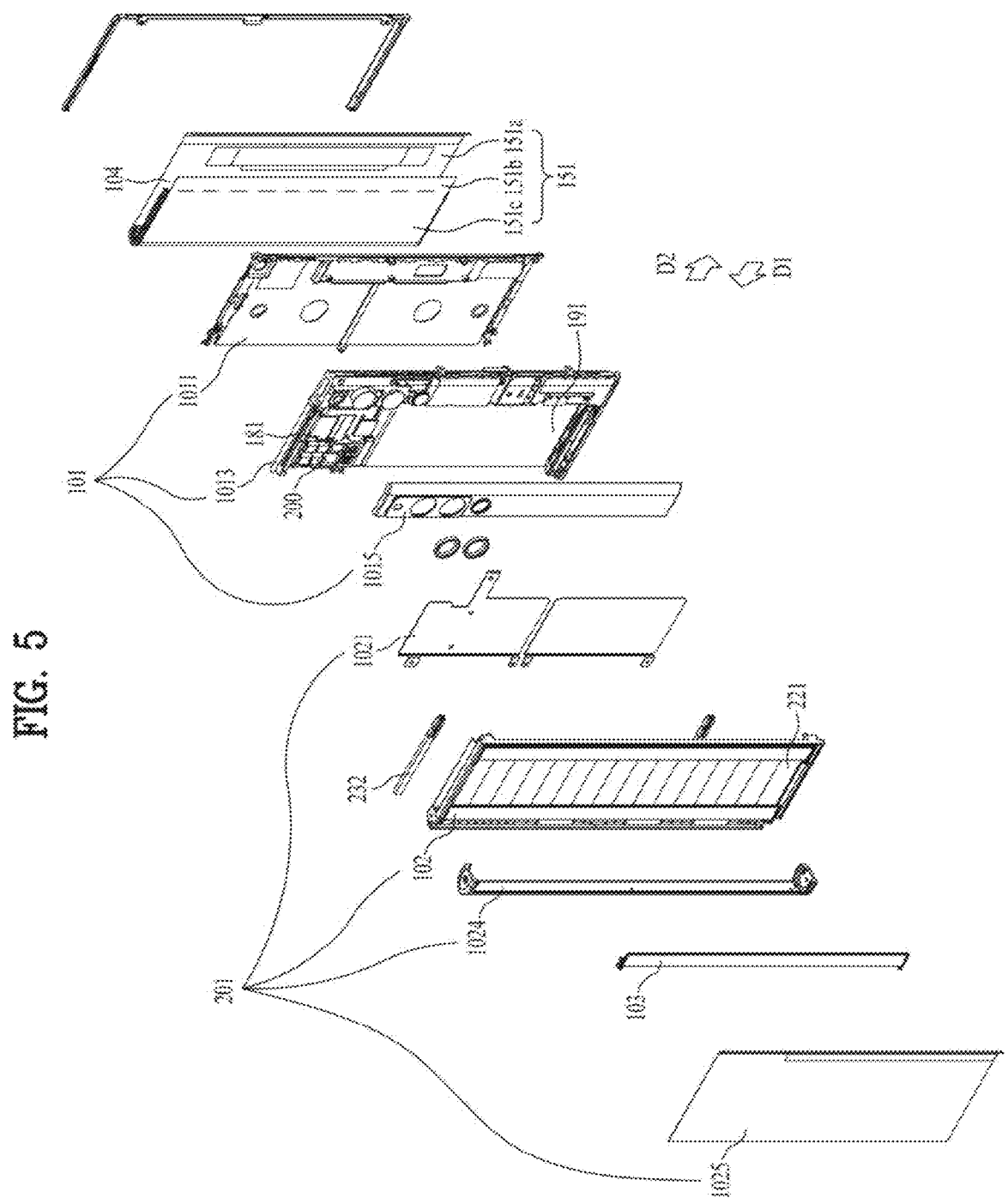

FIGS. 4 and 5 are exploded perspective views of the mobile terminal in accordance with an embodiment. FIG. 4 is an exploded perspective view of the mobile terminal as viewed from the front side, and FIG. 5 is an exploded perspective view of the mobile terminal as viewed from the rear side.

The mobile terminal 100 of the present disclosure includes frames 101 and 102 in which components are mounted, and the frames 101 and 102 of the present disclosure may vary in size in the first direction as shown in FIG. 2. One or more frames 101 and 102 move relative to each other, and sizes thereof may vary in the first direction. Electronic components are mounted in the frames 101 and 102, and the flexible display unit 151 is located out of the frames 101 and 102.

Since the mobile terminal 100 of the present disclosure includes the flexible display unit 151, the flexible display unit 151 may be combined in a form surrounding front faces and rear faces of the frames 101 and 102. The frame may include the first frame 101 and the second frame 102 moving in the first direction with respect to the first frame 101. The first frame 101 and the second frame 102 include front portions, rear portions, and side portions, respectively, and are coupled to each other.

First, the first frame 101 corresponds to a main body of the mobile terminal 100, and may have a space between the first front portion 1011 and the first rear portion 1012 therein for accommodating various components. In addition, the first frame 101 may accommodate the second frame 102 movably coupled to the first frame 101 in such a space. More specifically, as shown in FIGS. 2 and 5, the first frame 101 may include a first front portion 1011 disposed at a front portion of the mobile terminal 100 and supporting the front face of the display unit 151 and a first rear portion 1012 disposed at a rear portion of the mobile terminal and on which various components are mounted.

The first front portion 1011 and the first rear portion 1012 may be spaced apart from each other at a predetermined spacing to define a predetermined space therebetween, and may be connected to each other by a first side portion 1013. The first side portion 1013 may be integrally formed with the first rear portion 1012 or the first front portion 1011. The camera 121, the audio output module 152, and the input/output terminal 161, the controller 180, and the power supply unit 190 may be accommodated as components of the mobile terminal 100 in the space in the first frame 101. For example, the controller 180 may be a circuit board 181 including a processor and an electronic circuit for controlling the operation of the mobile terminal, and the power supply unit 190 may be a battery 191 and related components. In addition, the driving unit 200 that controls the slide movement of the second frame 102, which will be described later, may also be accommodated in the first frame 101.

As described above, the display unit 151 has the continuous body, and thus, may be disposed on both the front face and the rear face of the mobile terminal 100 while being rolled in the mobile terminal 100. The display unit 151 may include the front face positioned at the front face of the mobile terminal 100, the rear face positioned at the rear face of the mobile terminal 100, and the side face positioned between the front face and the rear face thereof and surrounding the side face of the mobile terminal. The front face and the rear face of the display unit 151 are flat, and the side face of the display unit 151 may form a curved face. The flexible display unit 151 may be damaged when being bent at an angle. Thus, the flexible display unit 151 may be formed to be bent with a predetermined curvature at the side face.

The display unit 151 may be divided into a fixed portion 151*a* and 151*b* and a variable portion 151*c*. The fixed portion 151*a* and 151*b* means a portion fixed to the frame. Because of being fixed to the frame, the fixed portion 151*a* and 151*b* maintains a constant shape without changing a bending degree. On the other hand, the variable portion 151*c* means a portion in which a bending angle or a position of the bent portion changes. The variable portion 151*c* in which the position or bending angle of the bent portion changes requires a structure for supporting a rear face of the variable portion 151*c* in response to the change.

The fixed portion 151*a*, 151*b* is coupled to the first frame of the display unit and is always positioned on the front face of the display unit to form a portion of the front face of the display unit. The variable portion 151*c* includes a side face located at a side portion of the mobile terminal, and a position of the side face varies depending on the position of the second frame. Based on a side face, a region of a portion disposed on the front face of the display unit and a region of a portion disposed on the rear face of the display unit vary. That is, a portion of the variable portion 151*c* may be the front face and another portion of the variable portion 151*c* may be the rear face based on the first and second states. The variable portion 151*c* is positioned in the first direction with respect to the fixed portion 151*a*, 151*b* relative to the mobile terminal, and an end of the variable portion 151*c* is bent toward the rear face of the mobile terminal and slides on the rear face of the second frame.

The end of the variable portion of the display unit is coupled with a slide frame that guides the variable portion to slide move on the rear face of the second frame, and the slide frame moves in the first direction at the same time as the second frame moves in the first direction. As a result, a moving distance of the slide frame with respect to the first frame is twice as a moving distance of the second frame with respect to the first frame. Further, as shown in FIG. 3, the first rear portion 1012 of the mobile terminal 100 includes an exposed rear portion 1015 that is exposed to the outside without being covered by the display unit 151 even in the first state. The physical input unit 120 for the manipulation of the mobile terminal 100 such as various buttons, switches, the camera 121, and a flash, and the sensing unit 140 such as the proximity sensor 141 or a fingerprint sensor may be arranged on the exposed rear portion 1015. The first rear portion 1012 except for the exposed rear portion 1015 may be covered by the display unit 151 in the first state as shown in FIG. 3(*a*), and may be exposed rearward in the second state as shown in FIG. 3(*b*).

In a conventional bar-shaped terminal, a display unit is provided only on a front face of the terminal. Therefore, a main camera is placed on a rear face of the terminal in order for the user to capture an object at an opposite side while looking through the display unit. On the other hand, an additional auxiliary camera is required to be disposed on the front face of the terminal in order for the user to capture himself or herself while viewing himself or herself through the display unit.

In the mobile terminal 100 of the present disclosure, on the other hand, the display unit 151 is arranged on both the front and rear of the mobile terminal 100. Accordingly, when a user photographs himself, a portion of the display unit 151 positioned on the same surface as the camera 121, that is, the rear face of the display unit 151 may be used. When the user takes a photograph of an object around the user, a portion of the display unit 151 on the side facing away from the camera 121, that is, the front face of the display unit 151 may be used. For this reason, the mobile terminal 100 may take a photograph of the user or an object located around the user using one camera 121. The camera may include a plurality of cameras having different angles of view, such as wide angle, ultra wide angle, and telephoto angle. Not only the camera but also a proximity sensor and an audio output unit may be disposed on the exposed rear portion 1015, and an antenna 116 may be installed on the rear portion 1015. An exposed decor 1015 may be used to protect the camera, the sensor, or the like on the exposed rear portion 1015 and not to deteriorate the exterior design. A portion of the exposed decor 1015 corresponding to the camera 121 or the sensor 140 may be configured to be transparent, and the other portion thereof may have a predetermined pattern or color in consideration of design aspects without exposing internal parts.

The first side portion 1013 may extend along the edges of the first front portion 1011 and the first rear portion 1012 to surround the circumference of the first frame 101 and may define the appearance of the mobile terminal 100. However, as mentioned above, the second frame 102 is accommodated in and movably coupled to the first frame 101, and therefore a portion of the first frame 101 needs to be open to allow movement of the second frame 102 relative to the first frame 101. As an example, as best shown in FIG. 2, the second frame 102 may be movably coupled to a side of the first frame 101 facing in the first direction, and accordingly the first side portion 1013 may not be formed on the lateral surface facing in the first direction such that the lateral surface is open. Since the first side portion 1013 is exposed to the outside of the mobile terminal 100, the interface unit 160 for connecting a power port or an ear jack or the user input unit 120, such as a volume control button, may be disposed on the first side portion 1013. When the first side portion 1013 contains a metal material, the first side portion 1013 may serve as an antenna.

The second frame 102 may include a second front portion 1021 disposed at the front portion of the mobile terminal 100 and a second rear portion 1022 disposed at the rear portion of the mobile terminal 100. Like the first front portion 1011 and the first rear portion 1012 of the first frame 101, the second front portion 1021 and the second rear portion 1022 may be formed of plate-shaped members that are generally flat. In addition, the second frame 102 also accommodates various components, and must not interfere with the components accommodated in the first frame 101 during the movement. Accordingly, the second front portion 1021 and the second rear portion 1022 may be coupled to each other in a state of being spaced apart from each other to define a predetermined space therebetween, and may have shapes that do not interfere with the components in the first frame 101.

FIG. 6 is a side view of the mobile terminal as viewed from a third direction. FIG. 6 illustrates the first side portion 1013 of the first frame 101 and a second side portion 1023 of the second frame 102. Since the flexible display unit 151 is positioned at an end of the second frame 102 facing in the first direction, the end of the second frame 102 facing in the first direction should not be exposed to the outside. An end of the second frame 102 facing in the second direction should be open so as not to interfere with the first frame 101. In the first state, the second side portion 1023 of the second frame 102, which is positioned on the side facing in the third direction (which refers to the upward or downward direction in the drawing or may include both the upward and downward directions), may not be exposed to the outside because it overlaps the first side portion 1013 of the first frame. However, in the second state, it may be exposed to the outside because the second frame 102 is drawn out.

In addition, the display unit 151 may be bent 180 degrees while being rolled in the second frame 102 to be disposed on both the front face and the rear face of the mobile terminal 100. For such an arrangement of the display unit 151, the second frame 102 may include a roller 210 rotatably disposed therein. The roller 210 may be disposed at any position inside the second frame 102. However, the display unit 151 should be spread flat on the front face and the rear face of the mobile terminal 100 to provide a good quality screen to the user. Further, for such spread, a proper tension must be provided on the display unit 151. In order to provide the proper tension, the roller 210 may be disposed at a first directional end of the second frame 102. The roller 210 may extend in the third direction, and may be rotatably coupled to the second frame 102.

The display unit 151 may be rolled around the roller 210 while being gently bent with a predetermined curvature. The flexible display unit 151 may include a first face on which a video is output and exposed to the outside and an inner face facing the frame at the opposite side. The roller 210 may be installed to rotate freely in the second frame 102 while being in contact with the inner face of the display unit 151. Accordingly, the roller 210 may actually move the display unit 151 in a lateral direction of the mobile terminal 100, that is, in a direction perpendicular to a longitudinal direction. As will be described later, when the second frame 102 slides, because of the tension applied by the second frame 102, the display unit 151 moves to the front face or the rear face of the mobile terminal 100 in different directions (i.e., the first direction D1 or the second direction D2) relative to the second frame 102. The roller 210 may guide such movement while rotating.

The roller 210 may be disposed adjacent to the end of the second frame 102 that faces in the first direction. A side frame 1024 may be disposed at the end of the second frame 102 facing in the first direction to prevent damage to the display unit 151 rolled around the roller 210.

The side frame 1024 may extend in the longitudinal direction (the third direction) of the second frame 102 to cover the side portion facing in the first direction, thereby protecting the roller 210 and the display unit 151 rolled therearound.

Location may be varied according to the state of the mobile terminal. Since a side face is rolled around the roller, the side face is bend with a predetermined curvature and the inner face of a side frame may include a curved face corresponding to the curvature of the side face The side frame 1024 may substantially define the appearance of the mobile terminal 100 in cooperation with the first side portion 1013 of the first frame 101. In addition, the side portion of the second frame 102 that faces in the second direction may be omitted to minimize interference with the components arranged in the first frame 101 during movement.

During the expansion and the contraction in such first and second directions D1 and D2, the second frame 102 may overlap the first frame 101, more precisely, the first front portion 1011 and the first rear portion 1012 thereof so as not to interfere with the first frame 101. More specifically, the display unit 151 may be coupled to and supported by the first front portion 1011 of the first frame 101, as described above. Accordingly, the display unit 151 does not need to be additionally supported by the second front portion 1021 of the second frame 102. Rather, when the second front portion 1021 is interposed between the first front portion 1011 and the display unit 151, the display unit 151 may be deformed or damaged because of friction with the second front portion 1021, which is repeatedly moved. Thus, the second front portion 1021 may be disposed below the first front portion 1011, or may be interposed between two first front portions 1011. The second rear portion 1022 of the second frame 102 may be disposed rearward of the first rear portion 1012 of the first frame 101. That is, the front face of the second rear portion 1022 may face the rear face of the first rear portion 1012. In addition, the rear face of the first rear portion 1012 may be in contact with the front face of the second rear portion 1022 to stably support the movement of the second frame 102. Because of such arrangement, the second rear portion 1022 may be exposed to the outside of the first frame, more precisely, of the first rear portion 1012, and may be coupled to the display unit 151.

In addition, the second frame 102 may extend and contract in the first and second directions D1 and D2 to change the size of the mobile terminal 100, particularly, to extend or contract the front face of the mobile terminal 100. Thus, the display unit 151 must move by such extended or reduced front face size to obtain the intended first and second states. However, when being fixed to the second frame 102, the display unit 151 may not be moved smoothly to be adapted for the front face of the mobile terminal 100 that is extended or contracted. For this reason, the display unit 151 may be movably coupled to the second frame 102.

More specifically, the display unit 151 may include a first region 151a disposed on the front of the mobile terminal 100, a second region 151b coupled to a slide frame 103 positioned on the rear of the mobile terminal 100, and a third region 151c located between the first region 151a and the second region 151b and bent around the roller 210. The third region 151c may move to the front or the rear according to change in the state of the mobile terminal 100. The slide frame 103 may be formed of a plate-shaped member extending in the longitudinal direction (the third direction) of the mobile terminal 100, and may be coupled to the second rear portion 1022 so as to be movable in the first and second directions D1 and D2.

The first to third regions 151a, 151b, and 151c may be connected to each other, and may form a continuous body of the display unit 151. In addition, as described above, for the movement of the third region 151c toward the front face or the rear face of the mobile terminal 100 depending on the moving direction of the second frame 102, the first region 151a may be fixed so as not to move to the front face of the mobile terminal 100, and the second region 151b may be provided to be movable on the rear face of the mobile terminal. Such configuration of the display unit 151 will be described in more detail below.

The first region 151a may be disposed on the front face of the mobile terminal 100, more specifically, the first frame 101, that is, on the front face of the first front portion 1011. The first region 151a is fixed to the first frame 101, that is, the front face of the first front portion 1011 so as not to be moved during the movement of the second frame 102, and thus, the first region 1511 may always be exposed to the front face of the mobile terminal 100.

The third region 151c may be adjacent to the first region 151a in a direction of the second side edge 151e, and may extend into the second frame 102 and rolled on the roller 210. The third region 151c may consecutively extend out of the second frame 102 again and partially cover the second frame 102, that is, the rear face of the second rear portion 1022. Further, the second frame 102, that is, the second rear portion 1022, is adjacent to the first frame 101, that is, the first rear portion 1012 and together forms the rear case of the mobile terminal 100, so that it may be described that the third region 151c is also disposed on the rear face of the first frame 101.

The second region 151b may be adjacent to the third region 151c and may be disposed on the rear face of the mobile terminal 100, more specifically, on the second frame 102, that is, the rear face of the second rear portion 1022 thereof. The second region 151b may be coupled to the slide frame 103 without being directly coupled to the second frame 102.

As a result, the first region 151a may be disposed on the front face of the mobile terminal 100 and may be always exposed to the front face regardless of the movement of the second frame 102, and the second region 151b may be disposed on the rear face of the mobile terminal 100 and may be always exposed to the rear face regardless of the movement of the second frame 102. In addition, the third region 151c may be disposed between the first and second regions 151a and 151b, and may be selectively placed on the front face or the rear face of the mobile terminal 100 depending on the moving directions D1 and D2 of the second frame 102.

Because of such selective placement of the third region 151c, as shown in FIG. 4, the first rear portion 1012 of the first frame 101 may be exposed to the outside of the mobile terminal 100 because the first rear portion 1012 is covered by the second and third regions 151b and 151c and the second rear portion 1022 of the display unit 151 in the first state, but, in the second state, the third region 151c moves to the front face of the mobile terminal 100 and the second rear portion 1022 also moves in the first direction D1. In addition, the second front portion 1021 of the second frame 102 is hidden by the first front portion 1011 of the first frame 101 in the first state, but, in the second state, moves out of the first frame 101 to support the third region 151c of the display unit 151 disposed on the front face of the mobile terminal 100.

In order to prevent the second front portion 1021 from affecting the internal components during the slide movement, a separating plate 1017 may be further disposed rearward of the second front portion 1021 and fastened with the first front portion 1011. The second front portion 1021 may move between the first front portion 1011 and the separating plate 1017 based on the slide movement of the second frame.

However, the third region 151c may be rolled on the roller 210 and bent in the second frame 102. When converting from the first state to the second state, the third region 151c may extend from the second frame 102 to the front face of the mobile terminal 100 while being rolled on the roller 210 in one direction. On the other hand, when converting from the second state to the first state, the third region 151c may be retracted from the front face of the mobile terminal 100 to the second frame 102 while being rolled on the roller 210 in the opposite direction, and at the same time, may return to the rear face of the mobile terminal 100 from the second frame 102.

A specific location of the foldable mobile terminal in a form of being spread like a book is easily damaged because only the specific location is folded repeatedly. On the other hand, the deformed portion of the flexible display unit 151, that is, a portion rolled on the roller 210, may vary based on the first and second states of the mobile terminal 100, that is, the movement of the second frame 102. Accordingly, the mobile terminal 100 of the present disclosure may significantly reduce deformation and fatigue repeatedly applied to a specific portion of the display unit 151, thereby preventing damage to the display unit 151.

Based on the above-described configuration, overall operations of the mobile terminal 100 will be described as follows. As an example, the state conversion may be performed manually by the user, and an operation of the mobile terminal 100 during such manual state conversion will be described. However, operations of the first to third frames 101 to 103 and the display unit 151, which will be described below, may be performed in the same manner when a power source other than a user's force is used, for example, when the driving unit 200 to be described below is applied.

A rear face cover 1025 may be further disposed on a rear face of the second rear portion 1022 such that the rear face of the display unit positioned on the rear face of the mobile terminal 100 is not exposed to the outside. The rear face of the display unit may be used in the first state when the rear face cover 1025 uses a transparent material, and the rear face of the display unit may be covered such that the movement of the slide frame 103 is not exposed when the rear face cover 1025 uses an opaque material. That is, the second region and the third region of the slide frame 103 and the display unit 151 may move in the first direction and in the second direction in a space between the second rear portion 1022 and the rear face cover 1025.

FIG. 7 is a view showing a driving unit 200 of the mobile terminal 100 in accordance with an embodiment. FIG. 7(a) illustrates the first state and FIG. 7(b) illustrates the second state. The mobile terminal 100 of the present disclosure may be switched between the states in a manner in which a user manually pulls the second frame 102 in the first direction D1 or pushes the same in the second direction D2 with respect to the first frame 101. However, in the manual method, applying excessive force to the body of the mobile terminal 100 may damage the mobile terminal 100. Accordingly, a driving unit 200 employing a motor 201 may be further provided to cause the second frame 102 to stably move without distortion.

As the motor 201, a motor 201 configured to provide rotational force as shown in FIG. 7, or a linear motor 201 configured to make linear motion may be used. The motor 201 configured to provide the rotational force should have a large diameter to provide large force. Two motors 201 may be used as shown in FIG. 7 to provide driving force of a predetermined magnitude or more in the limited space of the mobile terminal 100 without increasing the thickness.

If the second frame 102 is moved excessively fast, damage or malfunction may occur. Accordingly, a planetary gear configured to decrease the speed of the motor 201 to ensure movement at a stable speed may be further provided. The planetary gear 202 serves to amplify or attenuate the number of revolutions of the motor 201 using a plurality of disc gears having different numbers of teeth. The motor 201 may be fixed to the first frame 101 as shown in FIG. 7(a). The position of the motor 201 is fixed even when the second frame 102 moves in the first direction to switch the mobile terminal 100 to the second state, as shown in FIG. 7(b).

Since the second frame 102 linearly moves with respect to the first frame 101 in the first direction or the second direction, rack and pinion gears configured to convert the rotational force of the motor 201 into linear motion may be used. A pinion gear to receive the rotational force of the motor 201 may be arranged to engage with a rack gear 205 composed of teeth continuously arranged in the first direction. The pinion gear may be fixed to the first frame 101 together with the motor 201 and the rack gear 205 may be positioned on the second frame 102. Alternatively, the rack gear 205 may be positioned on the first frame 101, and the motor 201 and the pinion gear may be arranged on the second frame 102. Since the motor 201 holds the pinion gear such that the pinion gear does not rotate, the second frame 102 may maintain the first state and the second state. However, when large external force is applied, the second frame 102 may be displaced as the pinion gear rotates.

A stopper (not shown) configured to fix the positions of the second frame 102 or the rack gear 205 and the first frame 101 may be further provided to fix the mobile terminal 100 in the first state or the second state. When electric current flows through the motor 201 to drive the motor 201, the stopper may be released to allow the movement of the second frame 102. When power is not applied to the motor 201 and thus the motor 201 does not rotate, the first frame 101 and the second frame 102 may be fastened such that the positions thereof are fixed.

When a pair of driving units 200 is symmetrically disposed in the vertical direction (the third direction), stable movement may be made. However, to arrange a battery or the like, the driving unit 200 should be arranged biased to one side in consideration of the limited mounting space of the mobile terminal 100 as shown in FIG. 7(a). According to such asymmetric arrangement of the driving unit 200, the second frame 102 may be distorted during movement due to a difference in movement speed between the upper end portion and the lower end portion. To address this issue, a linear guide 230 may be further provided.

The linear guide 230 may be disposed at both ends of the mobile terminal 100 facing in the third direction, that is, on the upper and lower sides of the mobile terminal 100, in order to supplement the function of one driving unit 200 biased to one side in the third direction. The linear guide 230 may include a guide rail 231 extending in the first direction and a guide block 232 configured to move along the guide rail 231. The guide rail 231 may be disposed on the first frame 101 and the guide block 232 may be disposed on the second frame 102, or vice versa. In this embodiment, the guide rail 231 may be disposed on the second frame 102 to cover the upper and lower sides of the extended portion of the second frame 102 in the second state.

After the guide block 232 is coupled to the first frame 101 and the guide rail 231 is coupled to the second frame 102, the guide block 232 and the guide rail 231 may be slidably fastened to each other. However, for convenience of the fastening, the guide block 232 and the guide rail 231 fastened to each other. Then, the guide block 232 may be first fixed to the first frame 101, and then the second frame 102 may be coupled to the guide rail 231.

The guide block 232 may be provided with a guide groove into which the guide rail 231 is inserted. Alternatively, the guide rail 231 may be provided with a rail groove into which a portion of the guide block 232 is inserted. The fastening portions of the guide rail 231 and the guide block 232 may be formed to be bumpy. Accordingly, movement in the first direction or the second direction may be made without displacement in the thickness direction of the mobile terminal 100. In order to reduce friction between the guide block 232 and the guide rail 231, a self-lubricating member having high wear resistance and low friction resistance, such as a bearing or polyoxymethylene (POM), may be added to the inside of the guide groove.

FIG. 8 is a cross-sectional view taken along lines A-A and B-B in FIG. 2.

As illustrated in FIG. 2, when the second frame 102 switches to the second state by moving in the first direction, the third region 151c positioned on the rear side moves to the front, and thus a structure to support the rear surface of the third region 151c moved to the front is required. The second front portion 1021 positioned on the front surface of the second frame 102 may be positioned on the rear surface of the third region 151c in the second state. However, in the first state, the second front portion 1021 is disposed to overlap the first front portion 1011 of the first frame 101, and accordingly the first front portion 1011 and the second front portion 1021 form a step. A boundary is formed between the first region 151a and the third region 151c of the flexible display unit 151 by the step formed by the first front portion 1011 and the second front portion 1021. A rolling plate 104 may be used as a support structure to fill the gap between the second front portion 1021 and the third region 151c of the flexible display unit 151.

The rolling plate 104 may be positioned on the rear surface of the flexible display unit 151, and have a thickness corresponding to the gap between the second front portion 1021 and the flexible display unit 151 in the second state. As shown in FIG. 8(a), in the first state, the rolling plate 104 is rolled around the roller 210 and is positioned on the lateral side and rear side of the mobile terminal 100. The flexible display unit 151 and the rolling plate 104 may be positioned between the second rear portion of the second frame 102 and a rear cover 1025 provided to cover the rear face of the display unit 151. As shown in FIG. 8(b), when switch to the second state occurs, the rolling plate 104 may move to the front and the rolling plate 104 may be positioned on the front portion of the second frame 102.

The third region 151c of the display unit 151 in which the rolling plate 104 is positioned is a portion where bending deformation occurs when switch from the first state to the second state occurs. Accordingly, the rolling plate 104 may be deformed according to deformation of the third region

151c. Here, the rolling plate 104 is required to have a predetermined stiffness to maintain the flat state when the flexible display unit 151 is positioned on the front or rear of the mobile terminal. That is, the rolling plate 104 needs a structure capable of maintaining the flat state in the third direction and performing bending deformation in the first direction.

Hereinafter, embodiments related with a control method that may be implemented in the mobile terminal configured as described above will be described with reference to the attached drawings. Those skilled in the art will appreciate that the present disclosure may be carried out in other specific ways than those set forth herein without departing from the spirit and essential characteristics of the present disclosure.

Figure 9:
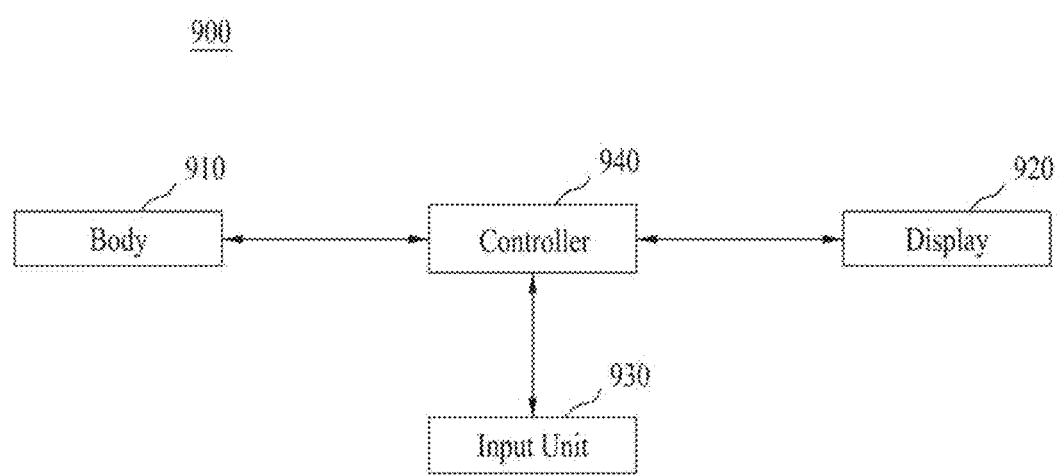
FIG. 9 is a block diagram illustrating constituent modules of a mobile terminal according to an embodiment of the present disclosure.

FIG. 9 is a block diagram illustrating constituent modules of a mobile terminal according to an embodiment of the present disclosure. The block diagram of FIG. 9 is for better explanation of an embodiment of the present disclosure, and the mobile terminal, which will be described below, may be implemented as the mobile terminal illustrated in FIGS. 1 to 8.

Referring to FIG. 9, a mobile terminal 900 according to an embodiment of the present disclosure may include a body 910, a display 920, an input unit 930, and a controller 940.

The body 910 is hardware constituting the mobile terminal 900 and may include a first frame and a second frame.

In an embodiment of the present disclosure, the second frame may be extendable or contractible from the first frame. Here, the first frame and the second frame may be implemented as the first frame and the second frame described with reference to FIGS. 1 to 8. That is, the second frame may be extended or contracted from the first frame manually or automatically by the above-described structure.

The mobile terminal 900 may further include a driving unit (not illustrated) for causing the second frame to be extended or contracted. Here, the driving unit may be implemented as the driving unit 200 of FIG. 7.

The mobile terminal 900 may operate in an enlarged display mode as the second frame is extended, and may operate in a reduced display mode as the second frame is contracted. The enlarged display mode and the reduced display mode may correspond to the first state and the second state, respectively, described in FIGS. 2 and 3.

The display 920 may be coupled to the body 910 so that a display region viewed from the front of the body 910 may vary as the display 920 switches between the enlarged display mode and the reduced display mode. That is, the display 920 may surround the front, side, and rear faces of the body 910. The display 920 may be implemented as the flexible display unit 151 of FIG. 1.

In an embodiment of the present disclosure, as the second frame is extended, a display portion positioned on the side of the body 910 may move to the front of the body 910, and a display portion positioned on the rear of the body 910 may move to the front of the body 910 via the side of the body 910.

As the second frame is contracted, the display portion positioned on the front of the body 910 may move to the side of the body 910 or to the rear of the body 910 via the side of the body 910.

In an embodiment of the present disclosure, a state in which the second frame is not extended, i.e., a state in which the mobile terminal 900 is in the reduced display mode, may be defined as a default state.

The display 920 may display visual information. The visual information may include text, indicators, icons, content, applications, images, and videos. The display 920 may output visual information on a screen based on a control command of the controller 940.

The display 920 may split a region in an enlarged display mode. More specifically, the display may output different pieces of information in split regions. For example, the display 920 may output a first application in a first region and a second application in a second region.

The display 920 may output a visual effect. More specifically, the display 920 may assign an effect to output visual information rather than simply outputting visual information. For example, the display 920 may perform black and white processing, blur processing, or dimming process upon output applications.

Although the display 920 may have an inter-layered structure or an integrated structure with a touch sensor as illustrated with reference to FIG. 1, so that the display 920 may be implemented with a touch screen, an output function and a touch function may be individually controlled. This will be described hereinbelow with reference to the drawings.

The input unit 930 may receive a variety of user input for the mobile terminal 900 and delivers an input result to the controller 940 so that the controller 940 may perform an operation based on user input. For example, the input unit 930 may receive an input signal of touching a first region from the user and deliver an input result to the controller 940 so that the controller 950 may determine that the user has selected the first region.

In an embodiment of the present disclosure, the input unit 930 may be provided on the display 920 and may be implemented as a touch screen. Although the input unit 930 may be included in the display 920, a touch function may be controlled separately from an output function of the display 920. The input unit 930 may be implemented as the input unit 120 of FIG. 1.

The input unit 930 may detect touch input from the user. In this case, the input unit 930 may also detect a point at which the touch input is sensed, a touched area, and touched pressure.

The input unit 930 may receive an input signal of simply touching an icon or an indicator from the user and receive a touch and drag input signal of touching an icon or an indicator and then dragging the icon or the image to another position.

The controller 940 may process data, control the units of the mobile terminal 900 described above and control data transmission/reception between the units. In the present disclosure, the controller 940 may be implemented as the controller 180 of FIG. 1.

Operations performed by the mobile terminal 900 may be controlled by the controller 940. However, in the drawings and the following description, these operations will be collectively described, for convenience, as being performed/controlled by the mobile terminal 900.

Hereinafter, embodiments of the present disclosure will be described with reference to FIGS. 10 to 20. In describing and understanding the embodiments of the present disclosure, reference may be made to the above description given with reference to FIGS. 1 to 9.

Figure 10:
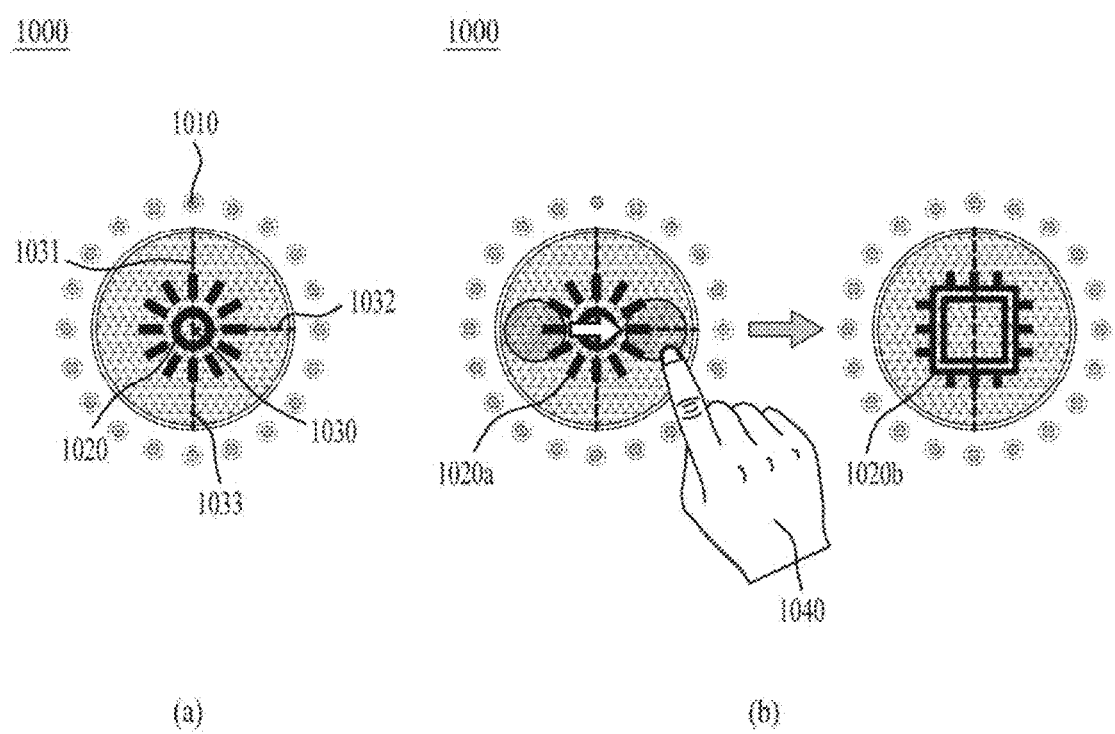
FIG. 10 is a diagram illustrating the structure of an icon according to an embodiment of the present disclosure.

FIG. 10 is a diagram illustrating the structure of an icon according to an embodiment of the present disclosure.

Referring to FIG. 10(a), an icon 1000 according to an embodiment of the present disclosure may include a dial indicator 1010, a function indicator 1020, and a line indicator 1030.

The icon 1000 may be used to control a function of an application which is being executed in a selected region. The mobile terminal may control the function of the application using the dial indicator 1010, the function indicator 1020, and the line indicator 1030 included in the icon 1000.

The dial indicator 1010 may be output in a shape surrounding the icon 1000 and a plurality of dial indicators may be configured. The number dial indicators 1010 may be preset and may be determined by user setting. An embodiment of controlling the function of the application by selecting the dial indicator 1010 will described hereinbelow with reference to figures.

The function indicator 1020 may be output inside the icon 1000 and correspond to the function of the application to be controlled. For example, when the mobile terminal adjusts the brightness of the application through the icon 1000, the mobile terminal may output, inside the icon 1000, the function indicator 1020 indicating the brightness of the application.

The line indicator 1030 may be output inside the icon 1000 and correspond to an indicator for distinguishing between split regions on the display. For example, when the mobile terminal uses the display by splitting a display region into a left region, an upper right region, and a lower right region in an enlarged display mode, the mobile terminal may output a first line indicator 1031, a second line indicator 1032, and a third line indicator 1033.

That is, the mobile terminal may output the line indicator 1030 to indicate split regions of the display on the icon 1000. The mobile terminal may output the line indicator 1030 on the icon 1000 based on the split regions of the display. For example, when the split regions in the enlarged display mode are a first region, a second region, and a third region, the mobile terminal may distinguishably output the icon 1000 split into three regions.

An embodiment of selecting an application using the line indicator 1030 will be described hereinbelow with reference to figures.

The mobile terminal may be aware of which function the user desires to control, in which region an application that the user desires to control is being executed, and to which degree the user is to control a function of an application, by outputting the dial indicator 1010, the function indicator 1020, and the line indicator 1030 on the icon 1000.

Referring to FIG. 10(*b*), the mobile terminal may control change of a function controlled by the icon 1000 based on a signal for the icon 1000.

More specifically, referring to the left drawing of FIG. 10(*b*), the icon 1000 may include a brightness indicator 1020*a*. In this case, the user may be aware that the function controlled by the icon 1000 is the brightness of an application.

Upon receiving a signal 1040 for the icon 1000, the mobile terminal may change the function controlled by the icon 1000. Referring to the right drawing of FIG. 10(*b*), the mobile terminal may change the function controlled by the icon 1000 from a brightness function to a resource function, based on the signal 1040. Thereby, the mobile terminal may change the function indicator included in the icon 1000 from the brightness indicator 1020*a* to a resource indicator 1020*b*.

In an embodiment of the present disclosure, the signal 1040 may be a touch and drag input signal of swiping the icon 1000 in a preset direction. More specifically, if the user touches the icon 1000 and then swipes the icon 1000 to the right, the mobile terminal may change the function controlled by the icon 1000 from the brightness function to the resource function.

An order in which the function controlled by the icon 1000 based on the signal 1040 is changed is exemplary and may be set to a default value or by the user.

FIG. 11 is a diagram illustrating an embodiment of selecting a region in an icon according to an embodiment of the present disclosure.

While the display is extended, the mobile terminal may execute multiple applications rather than one application in the enlarged display mode. When multiple applications are being simultaneously executed on the display, the mobile terminal needs to determine which application is selected or which function of an application is to be controlled.

FIGS. 11(*a*) and 11(*b*) are diagrams illustrating an icon 1100 for selecting a part of multiple applications which are being executed in split regions.

Referring to 11(*a*), the mobile terminal may select or deselect an application which is being executed on the display based on a signal for selecting a region of the icon 1100.

More specifically, as illustrated with reference to FIG. 10, the region of the icon 1100 may be divided based on the line indicator. The divided regions may correspond to split regions in which the mobile terminal is outputting applications on the display in the enlarged display mode.

Accordingly, the mobile terminal may determine that a first application (not illustrated) corresponding to a first region 1110 is selected or deselected from among the split regions on the display in the enlarged display mode, based on a first signal 1120 for selecting the first region 1110 of the icon 1100.

In an embodiment of the present disclosure, the first signal 1120 may be a touch input signal of touching the first region 1110 of the icon 1100 once. Thereby, the mobile terminal may determine that the first application corresponding to the first region 1110 is selected or deselected, based on the first signal 1120.

In an embodiment of the present disclosure, the mobile terminal may change selection or deselection of the first region 1110 when the user touches the first region 1110 of the icon 1100. That is, upon receiving a signal for selecting the first region 1110 in a state in which selection of the first region 1110 of the icon 1100 is released, the mobile terminal may determine that the first region 1110 is selected. On the other hand, upon receiving the signal for selecting the first region 1110 in a state in which the first region 1110 of the icon 1100 is selected, the mobile terminal may determine that the first region 1110 is deselected.

If the mobile terminal determines that the first application corresponding to the first region 1110 is selected based on the first signal 1120, the mobile terminal may control a function of the first application based on an added signal for the icon 1100.

Similarly, if the mobile terminal determines that the first application corresponding to the first region 1110 is deselected based on the first signal 1120, the mobile terminal may control functions of the remaining applications except for the first application based on the added signal for the icon 1100.

Accordingly, the mobile terminal may control functions of applications by selecting or deselecting a part of multiple applications which are being executed in the enlarged display mode.

FIG. 11(*b*) is a diagram illustrating an embodiment of selecting multiple regions at a time.

Referring to FIG. 11(*b*), the mobile terminal may selector deselect applications which are being executed on the display based on a signal for selecting a region of the icon 1100.

More specifically, the mobile terminal may determine that a first application, a second application, and a third application corresponding to the first region 1110 to a third region 1130 among split regions in which applications are being output in the enlarged display mode are selected or deselected, based on a second signal 1140 of touching the first region 1110 of the icon 1100 and then dragging the first region 1110 up to the third region 1130.

That is, if the user inputs the second signal 1140 of touching the first region 1110 and then releasing touch of the first region 1110 in the third region 1130 via the second region, the mobile terminal may determine that the user desires to select or deselect the first application corresponding to the first region 1110, the second application corresponding to the second region, and the third application corresponding to the third region 1130.

Similarly to FIG. 11(*a*), upon receiving a signal for selecting the first region 1110 to the third region 1130 of the icon 1100 in a state in which the first region 1110 to the third region 1130 of the icon 1100 are deselected, the mobile terminal may determine that the first region 1110 to the third region 1130 of the icon 1100 are selected.

On the other hand, upon receiving the signal for selecting the first region 1110 to the third region 1130 of the icon 1100 in a state in which the first region 1110 to the third region 1130 of the icon 110 are selected, the mobile terminal may determine that the first region 1110 to the third region 1130 of the icon 1100 are deselected.

If the mobile terminal determines that the first application, the second application, and the third application corresponding to the first region 1110 to the third region 1130 are selected based on the second signal 1140, the mobile terminal may control functions of the first application, the second application, and the third application at a time based on an added signal for the icon 1100.

Similarly, if the mobile terminal determines that the first application, the second application, and the third application corresponding to the first region 1110 to the third region 1130 are deselected based on the second signal 1140, the mobile terminal may control functions of applications except for the first application, the second application, and the third application based on an added signal for the icon 1100.

Accordingly, the mobile terminal may conveniently control functions of multiple applications by simultaneously selecting or deselecting a few applications among multiple applications which are being executed in the enlarged display mode.

Figure 12:
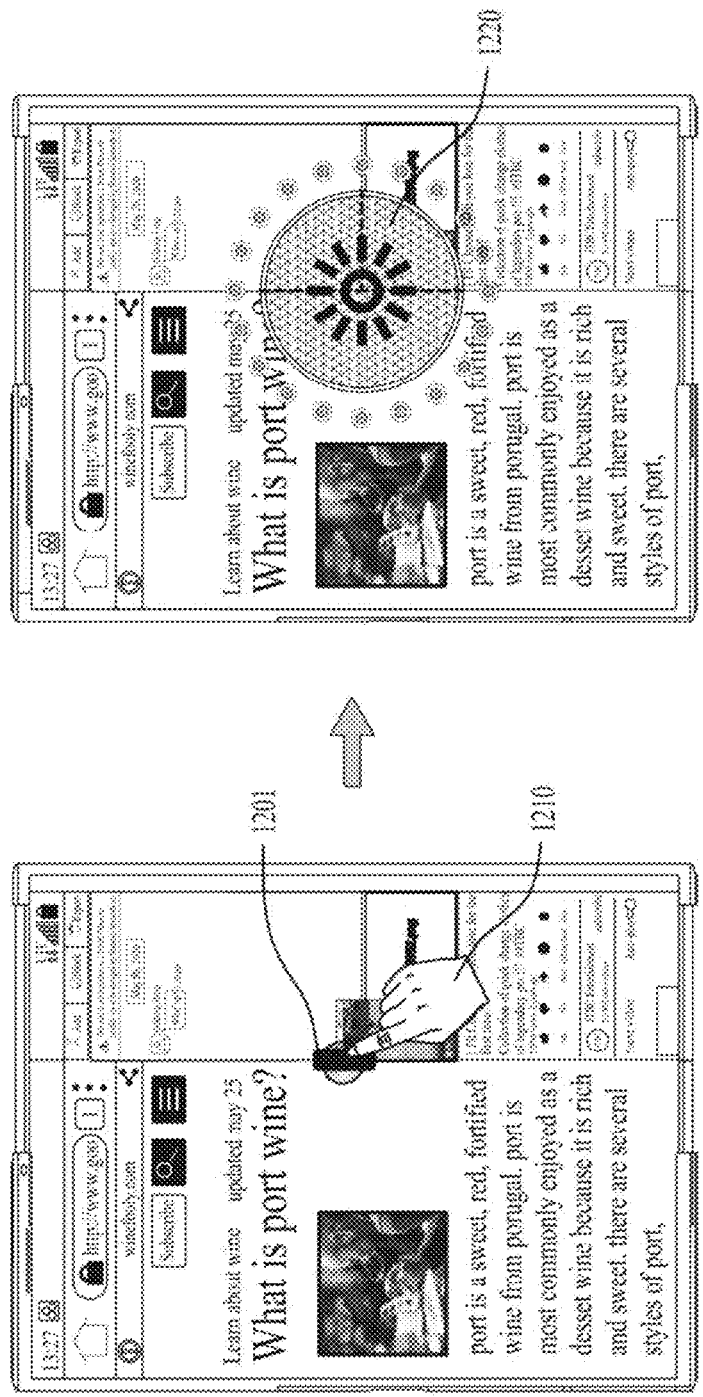
FIG. 12 is a diagram illustrating an embodiment of outputting an icon in a mobile terminal according to an embodiment of the present disclosure.

FIG. 12 is a diagram illustrating an embodiment of outputting an icon in a mobile terminal according to an embodiment of the present disclosure.

Referring to the left drawing of FIG. 12, the mobile terminal may receive a first signal 1210 in a state in which at least two applications are being executed in split regions.

That is, since the mobile terminal in the enlarged display mode has a wider display, the mobile terminal may simultaneously output at least two applications, as well as one application, on the display.

In this case, the mobile terminal may split the enlarged display into preset regions and output multiple applications in respective split regions.

The first signal 1210 may be a preset touch input signal of the user. In an embodiment of the present disclosure, the mobile terminal may receive the first signal 1210 only in a preset region. For example, if the user long-touches a center point 1201 of the split regions, the mobile terminal may determine that the first signal 1210 is received.

Referring to the right drawing of FIG. 12, the mobile terminal may control output of an icon 1220 according to the first signal 1210. The icon 1220 may be the icon described above with reference to FIGS. 10 and 11.

In the above-described example, upon receiving an input signal of long-touching the center point 1201 of the split regions from the user, the mobile terminal may output the icon 1220. The icon 1220 may be output in a preset region of the display. In FIG. 12, the icon 1220 is output at the center point 1201 of the split regions. However, the icon 1220 may be output at another position.

The mobile terminal may control selection of one or more regions among the split regions based on a second signal for the output icon 1220. More specifically, the mobile terminal may select or deselect the split regions based on the second signal for selecting the icon 1220. This process has been described above.

The mobile terminal may end output of the icon 1220 when the second signal is not received within a preset time after the icon 1220 is output.

The mobile terminal may control functions of applications which are executed in selected regions based on a third signal for the icon 1220. This process will be described below in detail with reference to figures.

Figure 13:
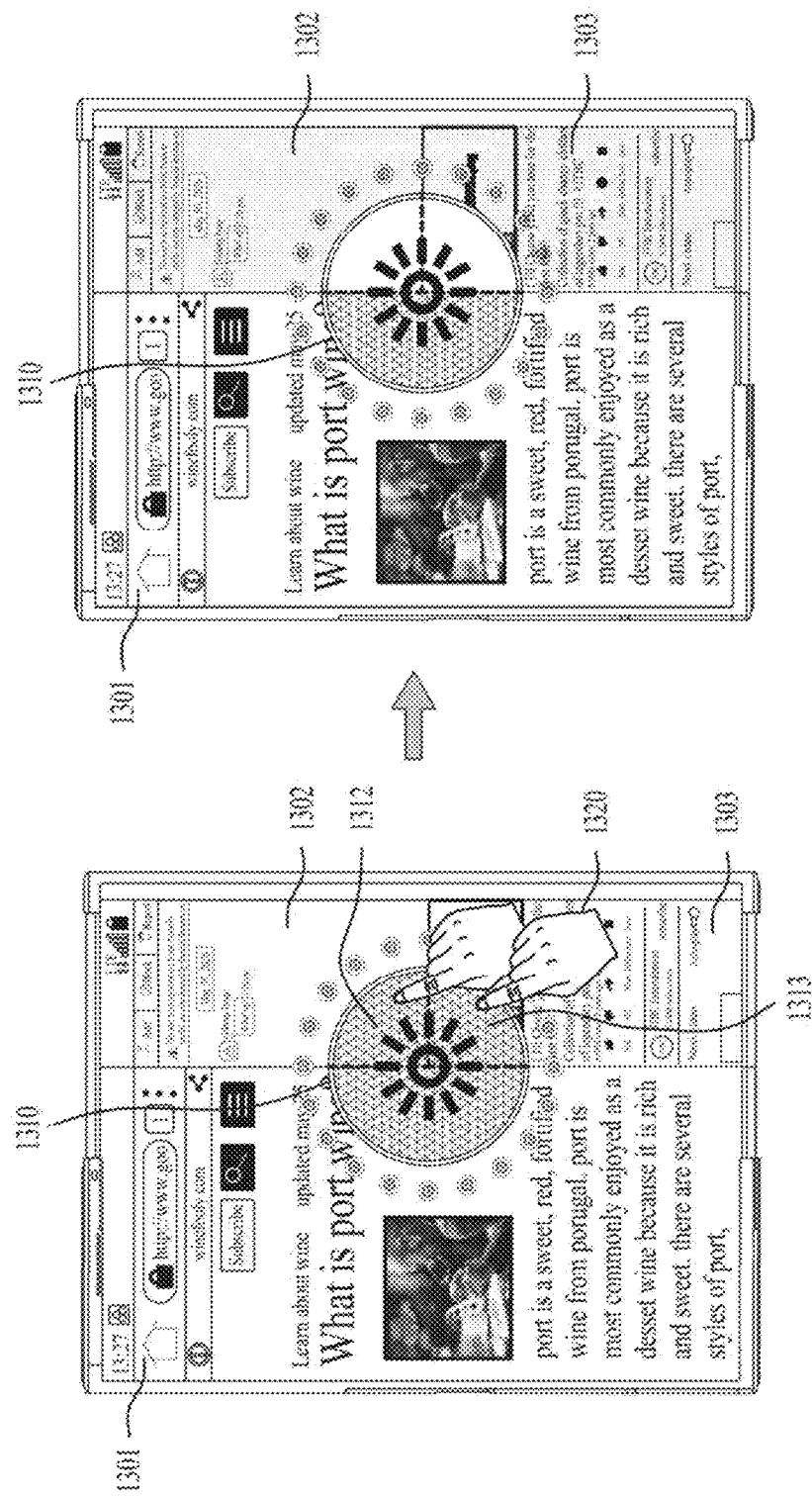
FIG. 13 is a diagram illustrating an embodiment of distinguishing between a selected region and an unselected region in a mobile terminal according to an embodiment of the present disclosure.

FIG. 13 is a diagram illustrating an embodiment of distinguishing between a selected region and an unselected region in a mobile terminal according to an embodiment of the present disclosure.

The left drawing of FIG. 13 illustrates an embodiment after the right drawing of FIG. 12.

The mobile terminal may determine a selected region among split regions based on a signal for an icon 1310 and control the display to distinguishably output a selected region and an unselected region.

More specifically, referring to the left drawing of FIG. 3, the mobile terminal may output the icon 1310 and select or deselect one or more regions among the split regions based on a first signal 1320 for the output icon 1310.

For example, the mobile terminal may split the display into a first region, a second region, and a third region in the enlarged display mode and the first region, the second region, and the third region may correspond to a first application 1301, a second application 1302, and a third application 1303, respectively, which are being executed.

The mobile terminal may select or deselect the second application 1302 and the third application 1303 corresponding to a second region 1312 and a third region 1313 among the split regions, based on the first signal 1320 for selecting the second region 1312 and the third region 1313 of the icon 1310.

More specifically, the user may touch the second region 1312 and the third region 1313 distinguished by a line indicator inside the icon 1310. Thereby, the mobile terminal may determine that the second application 1302 corresponding to the second region 1312 of the icon 1310 and the third application 1303 corresponding to the third region 1313 of the icon 1310 are selected or deselected.

Referring to the left drawing of FIG. 13, since it is assumed that all of the first application 1301, the second application 1302, and the third application 1303 are selected before the first signal 1320 is input, the mobile terminal may control deselection of the second application 1302 and the third application 1303 based on the first signal 1320.

Referring to the right drawing of FIG. 13, the mobile terminal may output a visual effect when a part of applications which are being executed on the display are deselected based on the first signal 1320.

More specifically, when an application is deselected based on the first signal 1320, the mobile terminal may apply black and white processing, blur processing, or dimming processing to the deselected application. Then, the deselected application may be output in black and white, blurredly, or dimly.

In the above-described example, when the second application 1302 and the third application 1303 are deselected based on the first signal 1320, the mobile terminal may blurredly output the second application 1302 and the third application 1303.

Meanwhile, the mobile terminal may output the first application 1301 without any processing so that the user may be aware that the first application 1301 is selected and the second application 1302 and the third application 1303 are deselected.

In addition to output of different visual effects to select or deselect applications, the mobile terminal may output different visual effects to select or deselect regions inside the icon 131054.

That is, when the second region 1312 and the third region 1313 of the icon 1310 are deselected according to the first signal 1320, the mobile terminal may output the second region 1312 and the third region 1313 of the icon 1310 in black and white.

Hereinafter, various embodiments of controlling a function of an application corresponding to a selected region will be described with reference to FIGS. 14 to 18.

Figure 14:
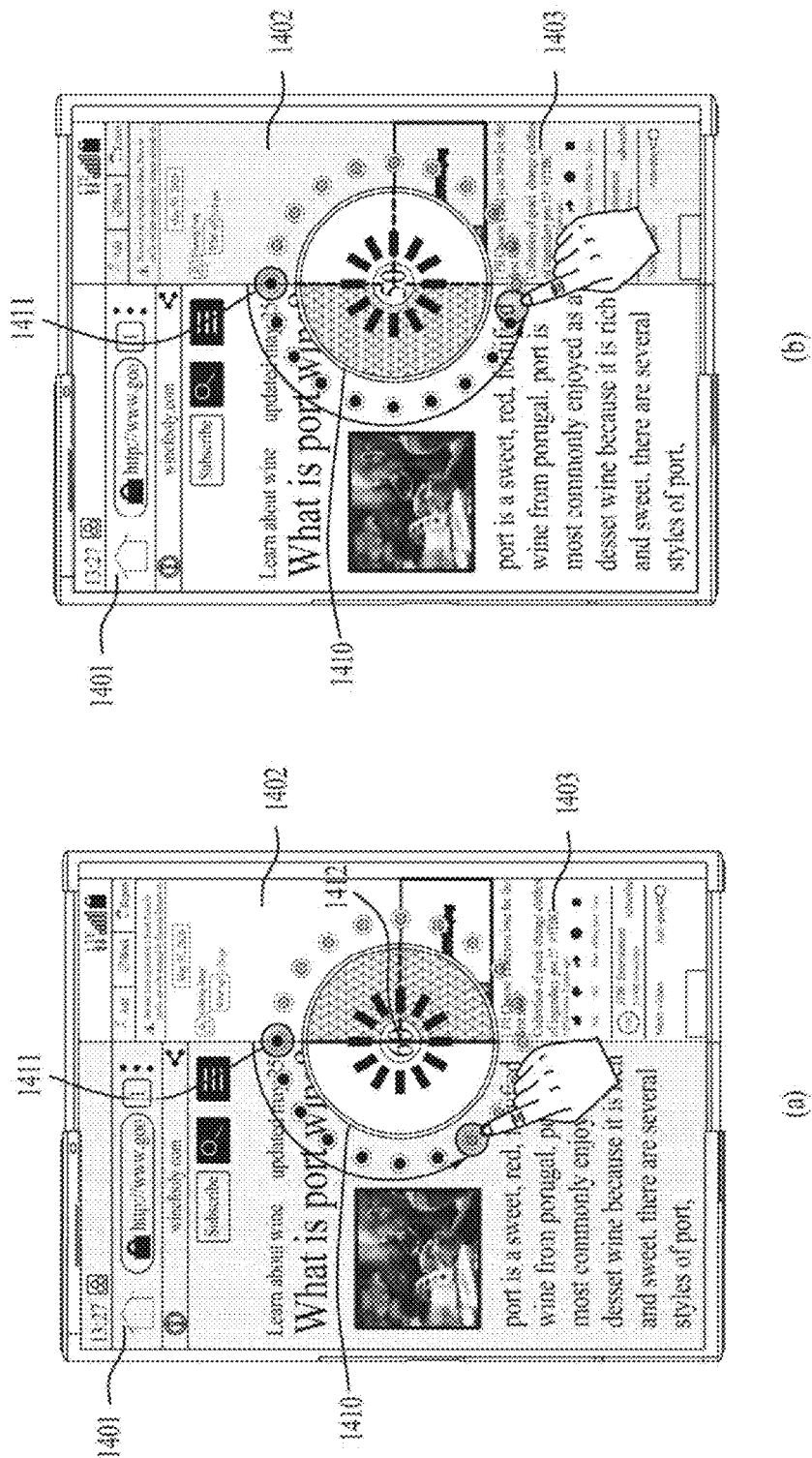
FIG. 14 is a diagram illustrating an embodiment of controlling a function of an application which is being executed in a split region in a mobile terminal according to an embodiment of the present disclosure.

FIG. 14 is a diagram illustrating an embodiment of controlling a function of an application which is being executed in a split region in a mobile terminal according to an embodiment of the present disclosure.

When a first region is selected, the mobile terminal may control a function of a first application which is being executed in the first region based on an input signal for controlling an icon.

In particular, the input signal for controlling the icon may be a signal of touching a dial indicator 1411, which is output together with the icon, or touching and dragging the icon 1411.

More specifically, the mobile terminal may execute a first application 1401 in the first region, a second application 1402 in a second region, and a third application 1403 in a third region among split display regions in the enlarged display mode.

Referring to FIG. 14(*a*), the first region of an icon 1410 may be deselected and the second region and the third region of the icon 1410 may be selected.

Thereby, the mobile terminal may deselect the first application 1401 which is being executed in the first region of the display and select the second application 1402 and the third application 1403 which are being respectively executed in the second region and the third region of the display.

The mobile terminal may receive a signal for controlling the icon 1410 in a state in which the second application 1402 and the third application 1403 are selected. Specifically, the mobile terminal may receive a signal of touching or touching and dragging the dial indicator 1411 which is output together with the icon 1410.

The mobile terminal may control functions of the second application 1402 and the third application 1403 which are selected based on a touch signal for manipulating the dial indicator 1411. That is, when two or more regions are selected, the mobile terminal may simultaneously control functions of applications which are being executed in the two or more regions based on one input signal for manipulating the icon.

Referring to 14(*a*), a function of an application controlled by the icon 1410 may be, for example, a brightness adjustment function. The mobile terminal may adjust the brightness of the second application 1402 and the third application 1403 based on a signal for manipulating the icon 1410.

For example, when the icon 1410 has a circular shape, a plurality of dial indicators 1411 may be represented along the outer edge of the icon 1410. The mobile terminal may brighten or darken the brightness of an application which is being executed in a selected region according to an input signal of touching and dragging the dial indicator 1411 in a counterclockwise direction.

The mobile terminal may control output of a numerical value 1412 corresponding to controlled brightness inside the icon 1410. For example, upon receiving the input signal for touching-dragging the dial indicator 1411, the mobile terminal may output the number 1412 of controlled brightness inside the icon 1412. Thereby, the user may check the numerical value 1412 of the controlled function.

FIG. 14(*b*) illustrates the case in which a region different from the region selected in FIG. 14(*a*) is selected. An embodiment of selecting and deselecting a region may refer to the above-described figure.

Referring to FIG. 14(*b*), the first region of the icon 1410 may be selected and the second region and the third region of the icon 1410 may be deselected.

Then, the mobile terminal may select the first application 1401 which is being executed in the first region of the display and deselect the second application 1402 and the third application 1403 which are being respectively executed in the second region and the third region of the display.

In a state in which the first application 1401 is selected, the mobile terminal may receive a signal for controlling the icon 1410. That is, the mobile terminal may control a function of the first application 1401 which is selected based on a touch signal for manipulating the dial indicator 1411 which is output together with the icon 1410.

If the function controlled by the icon 1410 is a brightness adjustment function, the mobile terminal may brighten or darken the brightness of the first application 1401 based on an input signal of touching and dragging the dial indicator 1411 in a counterclockwise direction.

To distinguish between selection or deselection of an application based on a touch and drag signal of the user, the dial indicators 1411 may be output in different colors. In the case of the brightness adjustment function for example, if the brightness of an application to be controlled is 100%, all dial indicators 1411 may be output in an orange color. However, if the brightness of the application is changed to 50% according to the touch and drag signal of the user, half of the touched and dragged dial indicators 1411 may be output in a black color. In this case, the mobile terminal may immediately output the dial indicators 1411 of different colors based on the touch-drag signal of the user.

The controllable function may include at least one of a brightness adjustment function, a sound adjustment function, a screen on/off switching function, a resolution adjustment function, a frames-per-second (FPS) adjustment function, or a system resource distribution function.

Figure 15A:
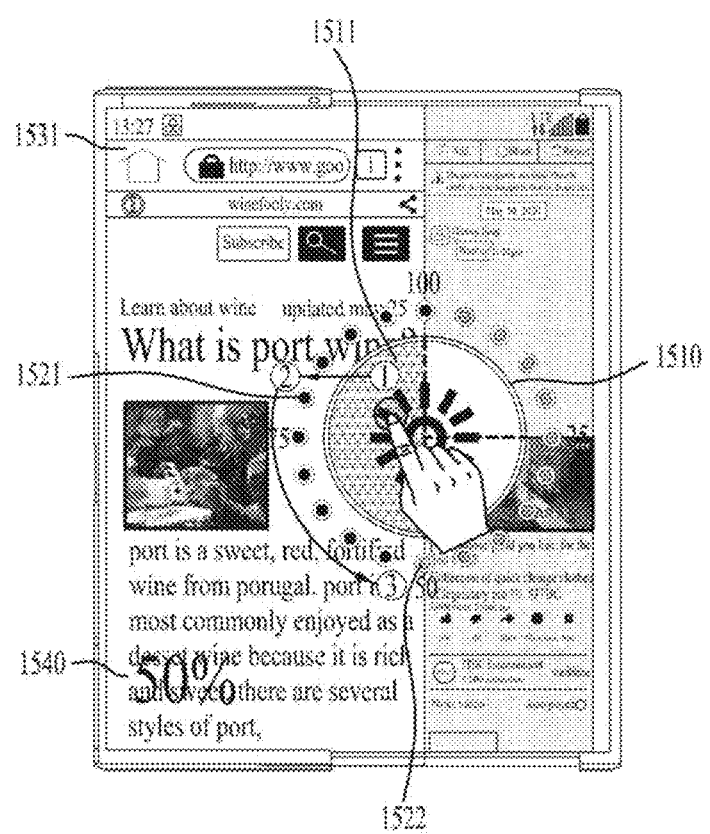
FIGS. 15A to 15C are diagrams illustrating another embodiment of controlling a function of an application which is being executed in a split region in a mobile terminal according to an embodiment of the present disclosure
Figure 15B:
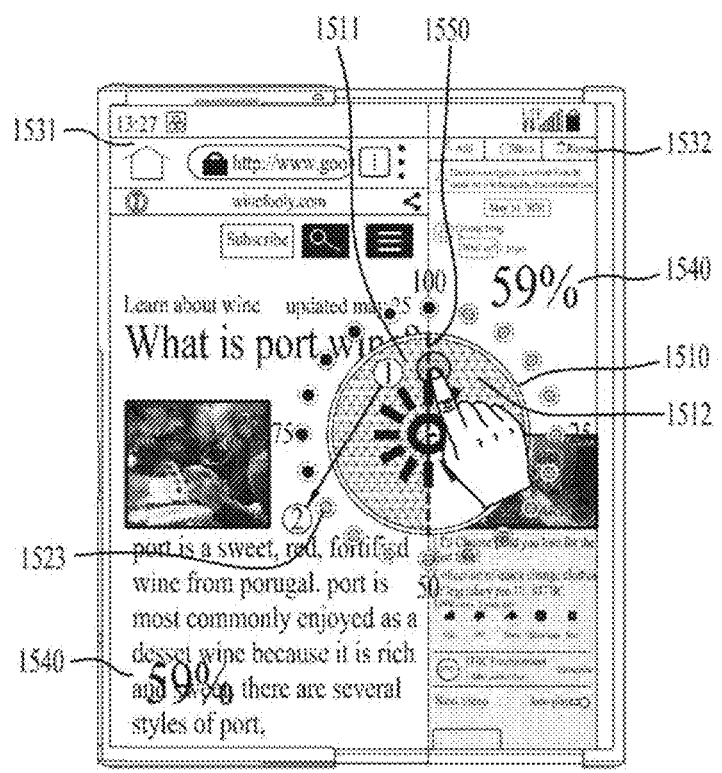
Figure 15C:
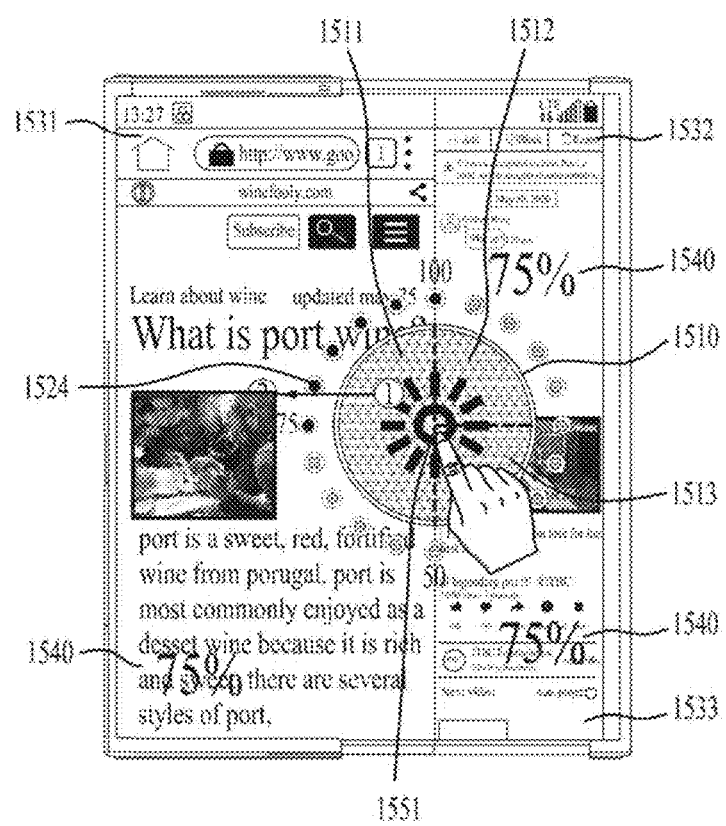

FIGS. 15A to 15C are diagrams illustrating another embodiment of controlling a function of an application which is being executed in a split region in a mobile terminal according to an embodiment of the present disclosure.

Referring to FIG. 15A, the mobile terminal may receive an input signal for selecting a first region 1511 of an icon 1510 and then selecting a first dial indicator 1521.

More specifically, after touching the first region 1511 of the icon 1510, the user may drag the first region 1511 to the first dial indicator 1521 while maintaining touch. In this case, a function controlled by the icon 1510 may be a brightness adjustment function and the first dial indicator 1521 may be an indicator having a brightness of 75%.

Accordingly, the mobile terminal may adjust the brightness of a first application 1531 which is being executed in the first region of the display corresponding to the first region 1511 of the icon 1510 to 75%.

In addition, the mobile terminal may receive an input signal of touching the first dial indicator 1521 in a state in which the first region 1511 of the icon 1510 is selected and then dragging the first dial indicator 1521 to a second dial indicator 1522.

More specifically, the user may touch the first dial indicator 1521 and then drag the first dial indicator 1521 to the second dial indicator 1522.

Thus, the mobile terminal may change the brightness of the first application 1531 from 75% to 50%. Since the mobile terminal adjusts the brightness of the first application 1531 based on the input signal of touching the first dial indicator 1521 and then dragging the first dial indicator 1521 to the second dial indicator 1522, the mobile terminal may adjust the brightness of the first application 1521 from 75% to 50% according to dragged speed.

That is, unlike the case in which the user simply selects the first dial indicator 1521, the mobile terminal may adjust the brightness of the first application 1531 based on the speed of dragging the first dial indicator 1521 to the second dial indicator 1522.

The mobile terminal may output a numerical value 1540 corresponding to a controlled function on the first application 1531, a function of which is controlled. That is, unlike the above description with reference to FIG. 14, the mobile terminal may output the numerical value 1540 corresponding to the controlled function on an application, a function of which is controlled, as well as inside the icon.

Referring to FIG. 15B, the mobile terminal may receive an input signal for selecting a first line indicator 1550 of the icon 1510 and then selecting a third dial indicator 1523.

More specifically, the user may touch the first line indicator 1550 of the icon 1510 and then drag the first line indicator 1550 to the third dial indicator 1523 while maintaining touch.

The first line indicator 1550 may be an indicator for distinguishing between the first region 1511 and a second region 1512 within the icon 1510. The mobile terminal may determine that the user selects a region adjacent to the first line indicator 1550 based on a signal for selecting the first line indicator 1550 included in the icon 1510.

For example, upon receiving an input signal of touching the first line indicator 1550 of the icon 1510, the mobile terminal may determine that the first application 1531 corresponding to the first region 1511 and a second application 1532 corresponding to the second region 1512 are selected.

Therefore, upon receiving a signal of touching the first line indicator 1550 and then selecting the third dial indicator 1523, the mobile terminal may control functions of the first application 1531 and the second application 1532.

When the third dial indicator 1523 corresponds to an indicator having a brightness of 59%, the mobile terminal may adjust the brightness of the first application 1531 and the second application 1532 to 59%.

That is, the user may simultaneously select adjacent regions by selecting the line indicator and simultaneously control functions of applications corresponding to the adjacent regions by selecting the dial indicator after selecting the line indicator.

As in FIG. 15A, the mobile terminal may output the numerical value 1540 corresponding to a controlled function on an application, a function of which is controlled. In this case, since there are two applications controlled in FIG. 15B, the mobile terminal may output the numerical value 1540 on the first application 1531 and the second application 1532.

Referring to FIG. 15C, the mobile terminal may receive an input signal for selecting a second line indicator 1551 of the icon 1510 and then selecting a fourth dial indicator 1524.

More specifically, the user may touch the second indicator 1551 of the icon 1510 and then drag the second line indicator 1551 to the fourth dial indicator 1524 while maintaining touch.

In this case, the second line indicator 1551 may be an indicator for distinguishing between the first region 1511, the second region 1512, and a third region 1513 within the icon 1510. In addition, the second line indicator 1551 may be an indicator indicating the center of the first region 1511, the second region 1512, and the third region 1513.

Accordingly, the mobile terminal may determine that the user selects regions adjacent to the second line indicator 1551 based on a signal for selecting the second line indicator 1551 included in the icon 1510.

For example, upon receiving an input signal of touching the second line indicator 1551 of the icon 1510, since the regions adjacent to the second line indicator 1551 are the first region 1511, the second region 1512, and the third region 1513, the mobile terminal may determine that the user selects the first application 1531 corresponding to the first region 1511, the second application 1532 corresponding to the second region 1512, and a third application 1533 corresponding to the third region 1513.

Upon receiving the signal of touching the second line indicator 1551 and then selecting the fourth dial indicator 1524, the mobile terminal may control functions of the first application 1531, the second application 1532, and the third application 1533.

For example, when the fourth dial indicator 1524 corresponds to an indicator having a brightness of 75%, the mobile terminal may adjust the brightness of the first application 1531, the second application 1532 and the third application 1533 to 59%.

Likewise, the user may simultaneously select all regions by selecting the center line indicator adjacent to all regions and simultaneously control functions of all applications.

As in the above-described embodiment, the mobile terminal may output the numerical value 1540 corresponding to a controlled function on an application, the function of which is controlled. In this case, since there are three applications controlled in FIG. 15C, the mobile terminal may output the numerical value 1540 on the first application 1531, the second application 1532, and the third application 1533.

In an embodiment of the present disclosure, the mobile terminal may end output of the numerical value after a preset time elapses after outputting the numerical value corresponding to a controlled function of an application.

More specifically, the mobile terminal may end output of the numerical value 1540 corresponding to a controlled function after the preset time elapses after outputting the numerical value 1540 on the first application 1531, the second application 1532 and the third application 1533.

Figure 16:
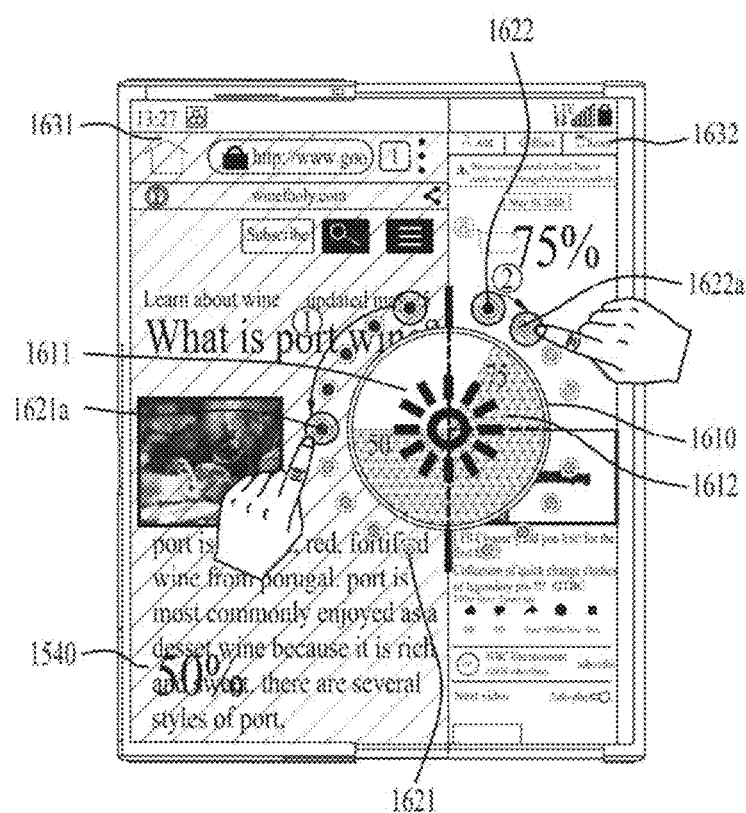
FIG. 16 is a diagram illustrating another embodiment of controlling a function of an application which is being executed in a split region in a mobile terminal according to an embodiment of the present disclosure.

FIG. 16 is a diagram illustrating another embodiment of controlling a function of an application which is being executed in a split region in a mobile terminal according to an embodiment of the present disclosure.

The mobile terminal may individually control multiple applications which are being executed in the extended display mode based on an input signal for an icon.

In the embodiment of FIG. 16, a first dial indicator 1621 positioned around a first region 1611 of an icon 1610 may control a function of a first application 1631 corresponding to the first region 1611, and a second dial indicator 1622 positioned around a second region 1612 of the icon 1610 may control a function of a second application 1632 corresponding to the second region 1612.

That is, unlike FIGS. 15A to 15C, in the embodiment of FIG. 16, the first region 1611 to a third region included in the icon 1610 do not share a dial indicator, and only the first dial indicator 1621 adjacent to the first region 1611 may control a function of the first application 1631 and only the second dial indicator 1622 adjacent to the second region 1612 may control a function of the second application 1632.

Accordingly, the dial indicators of FIG. 16 may have different values from the dial indicators of FIGS. 15A to 15C. That is, the first dial indicator 1621 is adjacent to the first region 1611 and may be composed of a plurality of dots, and the second dial indicator 1622 is adjacent to the second region 1612 and may be composed of a plurality of dots.

In addition, since only the first dial indicator 1621 controls the function of the first application 1631, the first dial indicator 1621 may represent a numerical value with a plurality of dots. For example, when the first dial indicator 1621 is composed of 10 dots, since the 10 dots mean 100%, a numerical value assigned to one dot may be 10%. As another example, when the second dial indicator 1622 is composed of 4 dots, since 4 dots mean 100%, a numerical value allocated to one dot may be 25%.

Referring to FIG. 16, upon detecting a signal for selecting a first value 1621a among the first dial indicators 1621, the mobile terminal may change the function of the first application 1631 corresponding to the first region 1611 to a numerical value corresponding to the first value 1621a.

In this case, the signal for selecting the first value 1621a may include a touch and drag input signal in a predetermined direction or a touch input signal. For example, the signal for selecting the first value 1621a may be an input signal of touching and dragging dots included in the first dial indicator 1621 and releasing touch at the first value 1621a.

For example, when the first value 1621a has a brightness of 50%, the mobile terminal may change the brightness of the first application 1631 to 50% according to the input signal for selecting the first value 1621a among the first dial indicators 1621.

Similarly, upon detecting a signal for selecting a second value 1622a among the second dial indicators 1622, the mobile terminal may change the function of the second application 1632 corresponding to the second region 1612 to a numerical value corresponding to the second value 1622a.

For example, when the second value 1622a has a brightness of 75%, the mobile terminal may change the brightness of the second application 1632 to 75% according to the input signal for selecting the second value 1622a among the second dial indicators 1622.

Although a function of an application controlled through the icon 1610 has been described as an example in terms of brightness, it is apparent that a sound adjustment function, a resolution adjustment function, an FPS adjustment function, and the system resource adjustment function may be applied to the function of the application.

Figure 17:
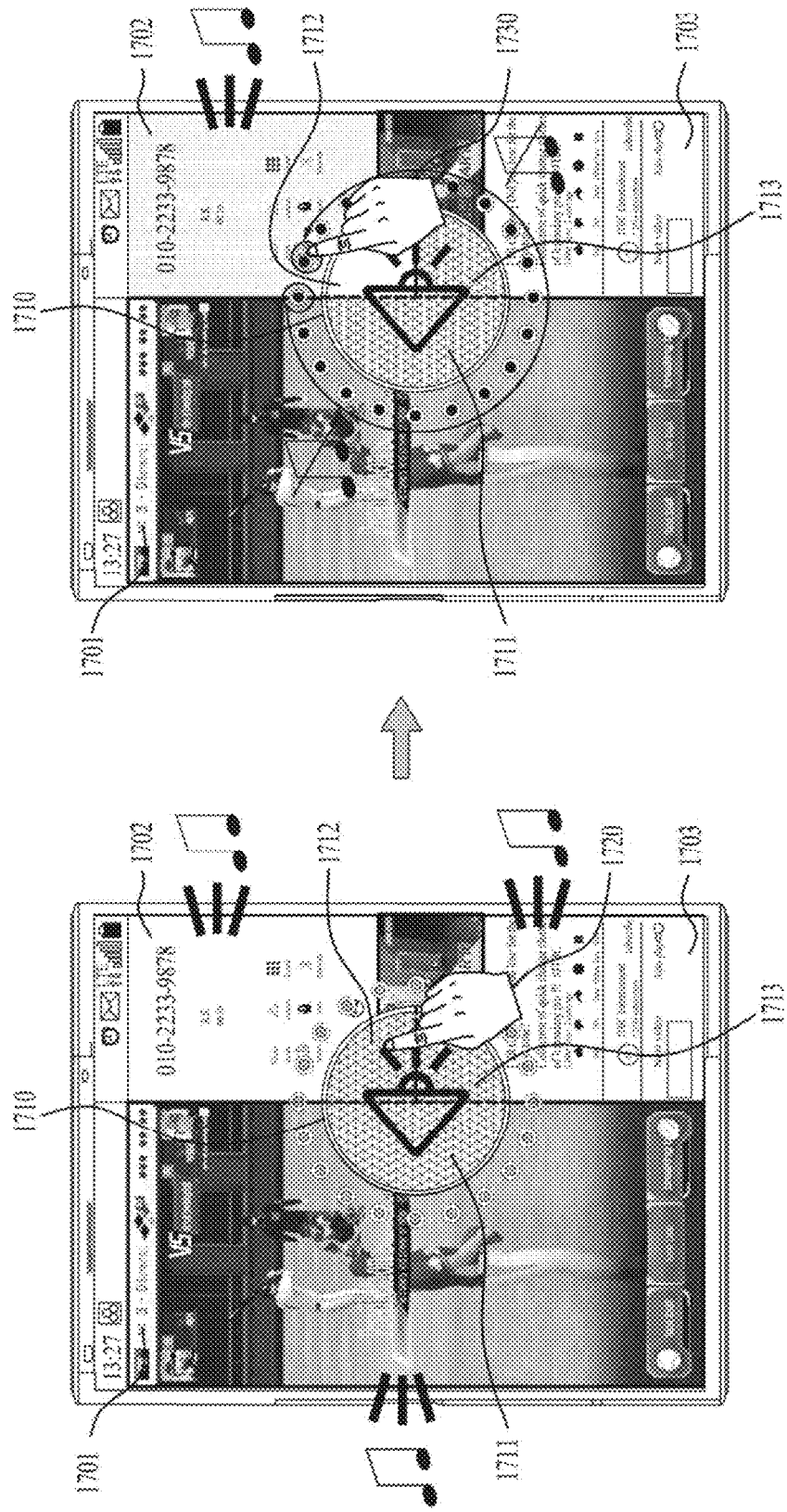
FIG. 17 is a diagram illustrating another embodiment of controlling a function of an application which is being executed in a split region in a mobile terminal according to an embodiment of the present disclosure.

FIG. 17 is a diagram illustrating another embodiment of controlling a function of an application which is being executed in a split region in a mobile terminal according to an embodiment of the present disclosure.

In the embodiment of FIG. 17, an embodiment in which an icon output in the enlarged display mode individually adjusts sound volume of applications which are being executed in split regions will now be described.

Referring to the left drawing of FIG. 17, the mobile terminal may execute a first application 1701 in a first region, a second application 1702 in a second region, and a third application 1703 in a third region, among split display regions in the extended display mode.

The first application 1701, the second application 1702, and the third application 1703 may all correspond to applications that output sound. The mobile terminal may individually control sound of the first application 1701, the second application 1702, and the third application 1703. For example, the first application 1701 may be a game application, the second application 1702 may be a phone call application, and the third application 1703 may be a video application.

In an embodiment of the present disclosure, the mobile terminal may control the sound of the first application 1701, the second application 1702, and the third application 1703 using an icon 1710.

More specifically, the mobile terminal may output the icon 1710 in the center of the extended display. The output icon 1710 may correspond to a state in which an internal region thereof is split so as to correspond to the applications which are being executed on the extended display.

The mobile terminal may detect a first input signal 1720 for selecting the second region 1712 of the icon 1710. For example, the user may touch the second region 1712 of the icon 1710.

In this case, a first region 1711, a second region 1712, and a third region 1713 of the icon 1710 may correspond to a selected state and it may be determined that the mobile terminal controls functions of the applications corresponding to the first region 1711, the second region 1712, and the third region 1713 through the icon 1710.

The mobile terminal may change the second region 1712 of the icon 1710 to an unselected state based on the first input signal 1720. This indicates that the mobile terminal does not control a function of an application corresponding to the second region 1712 through the icon 1710.

Referring to the right diagram of FIG. 17, upon detecting the first input signal 1720, the mobile terminal may change the second region 1712 to an unselected state and, thus, output the second application 1702 corresponding to the second region 1712 in black and white or darkly.

Accordingly, the user may be aware that the first application 1701 and the third application 1703 are controlled through the icon 1710.

The mobile terminal may detect a second input signal 1730 for manipulating a dial indicator of the icon 1710 in a state in which the first region 1711 and the third region 1713 of the icon 1710 are selected and the second region 1712 is not selected. For example, the user may touch and drag the dial indicator of the icon 1710 in a preset direction (clockwise or counterclockwise).

When the icon 1710 represents a function for controlling the volume of sound output by an application, the dial indicator of the icon 1710 may be composed of a plurality of dots and one dot may represent a numerical value of sound volume. For example, when the dial indicator is composed of 20 dots, the 20th dot may represent the loudest sound that the mobile terminal may output and the first dot may represent a state in which no sound is output.

Upon detecting the second input signal 1730, the mobile terminal may control functions of the first application 1701 and the third application 1703 corresponding to the selected first region 1711 and third region 1713.

In the above-described example, if the second input signal 1730 is an input signal of touching the dial indicator and dragging the dial indicator to the first dot along the 20th dot of the dial indicator, the mobile terminal may change volume of sound output by the first application 1701 and third application 1703 to zero based on the second input 1730.

That is, in a state in which the sound volume of the second application 1702 corresponding to the second region 1712, which is an unselected region of the icon 1710, is maintained, the mobile terminal may adjust the sound volume of the first application 1701 and the third application 1703 corresponding to the first application 1711 and the third region 1713 which are selected regions.

When sound is being output from all applications, the user may maintain output of sound of a desired application and quickly mute sound of the remaining applications. This function may be particularly useful when the user desires to quickly receive a phone call.

Figure 18:
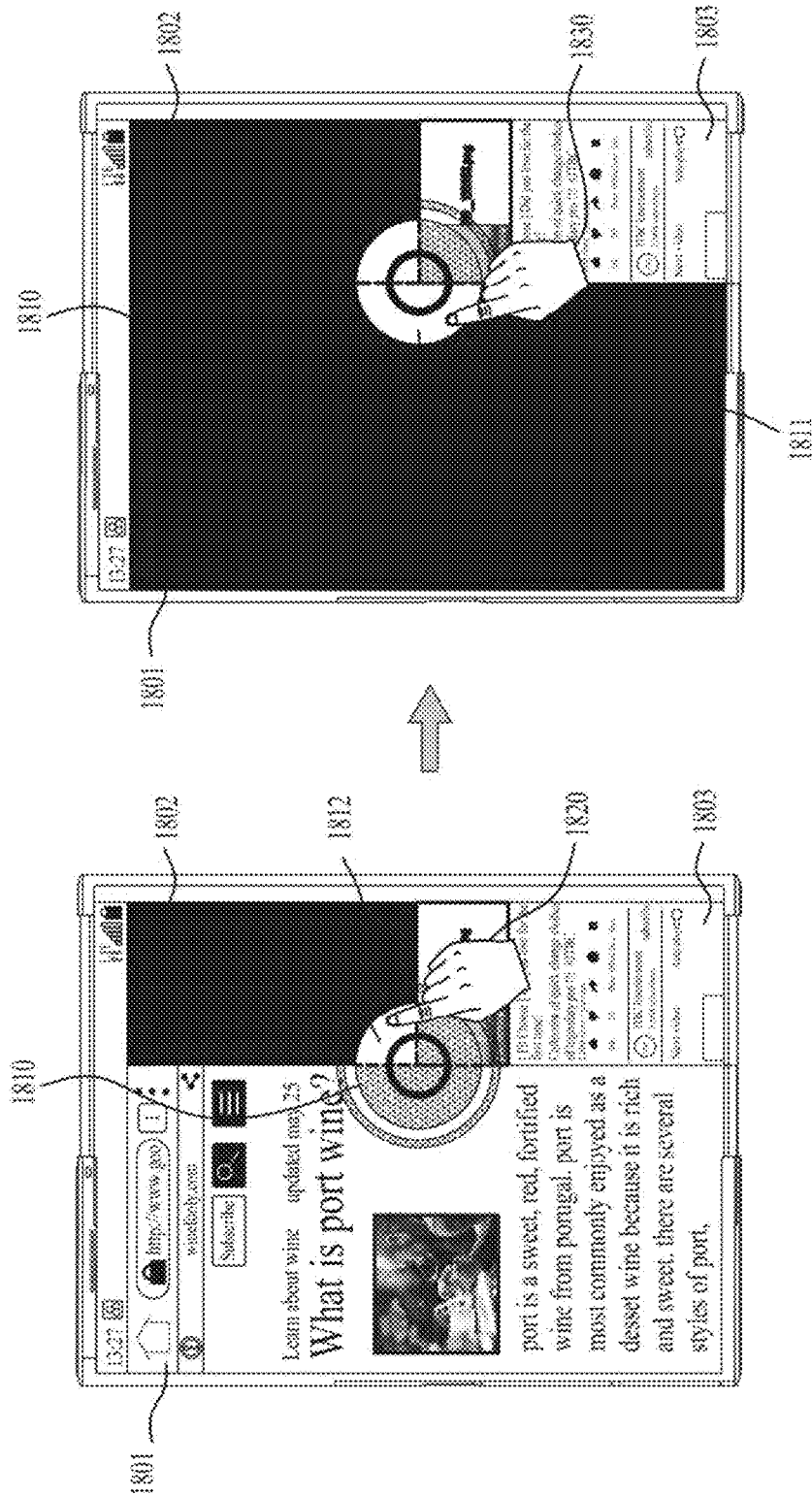
FIG. 18 is a diagram illustrating another embodiment of controlling a function of an application which is being executed in a split region in a mobile terminal according to an embodiment of the present disclosure.

FIG. 18 is a diagram illustrating another embodiment of controlling a function of an application which is being executed in a split region in a mobile terminal according to an embodiment of the present disclosure.

In the embodiment of FIG. 18, an embodiment of individually turning on or off screens of applications which are being executed in split regions using an icon will be described. In this case, a state in which the screen is turned on may be referred to as an on state, and a state in which the screen is turned off may be referred to as an off state.

Referring to the left drawing of FIG. 18, the mobile terminal may execute a first application 1801 in a first region, a second application 1802 in a second region, and a third application 1803 in a third region, among split display regions.

In an embodiment of the present disclosure, the mobile terminal may control the first application 1801, the second application 1802, and the third application 1803 using an icon 1810. In this case, a function of an application controlled by the icon 1810 may be a function of controlling the on/off state of the screen.

More specifically, the mobile terminal may receive a first input signal 1820 for selecting a second region 1812 of the icon 1810. For example, the user may touch the second region 1812 of the icon 1810.

In an embodiment of the present disclosure, when the screen of the second application 1802 is turned on, the mobile terminal may turn off the screen of the second application 1802 corresponding to the second region 1812 based on the first input signal 1820.

Here, changing the screen to the off state may include simply turning off the display on which the application is being output, or turning off a display region in which the application is being output and simultaneously changing the application to a power saving mode.

Similarly, although not shown in the drawing, when the screen of the second application 1802 is turned off, the mobile terminal may change the screen of the second application 1802 corresponding to the second region 1812 to an on state based on the first input signal 1820.

Referring to the right drawing of FIG. 18, the mobile terminal may detect a second input signal 1830 for selecting the first region 1811 of the icon 1810 in a state in which the screen of the second application 1802 is turned off. For example, the user may touch a first region 1811 of the icon 1810.

In an embodiment of the present disclosure, when the screen of the first application 1801 is turned on, the mobile terminal may change the screen of the first application 1801 corresponding to the first region 1811 to an off state based on the second input signal 1830.

Although not shown in the drawing, when the screen of the first application 1801 is turned off, the mobile terminal may turn on the screen of the first application 1801 again upon detecting the input signal for selecting the first region 1811 of the icon 1801.

Figure 19:
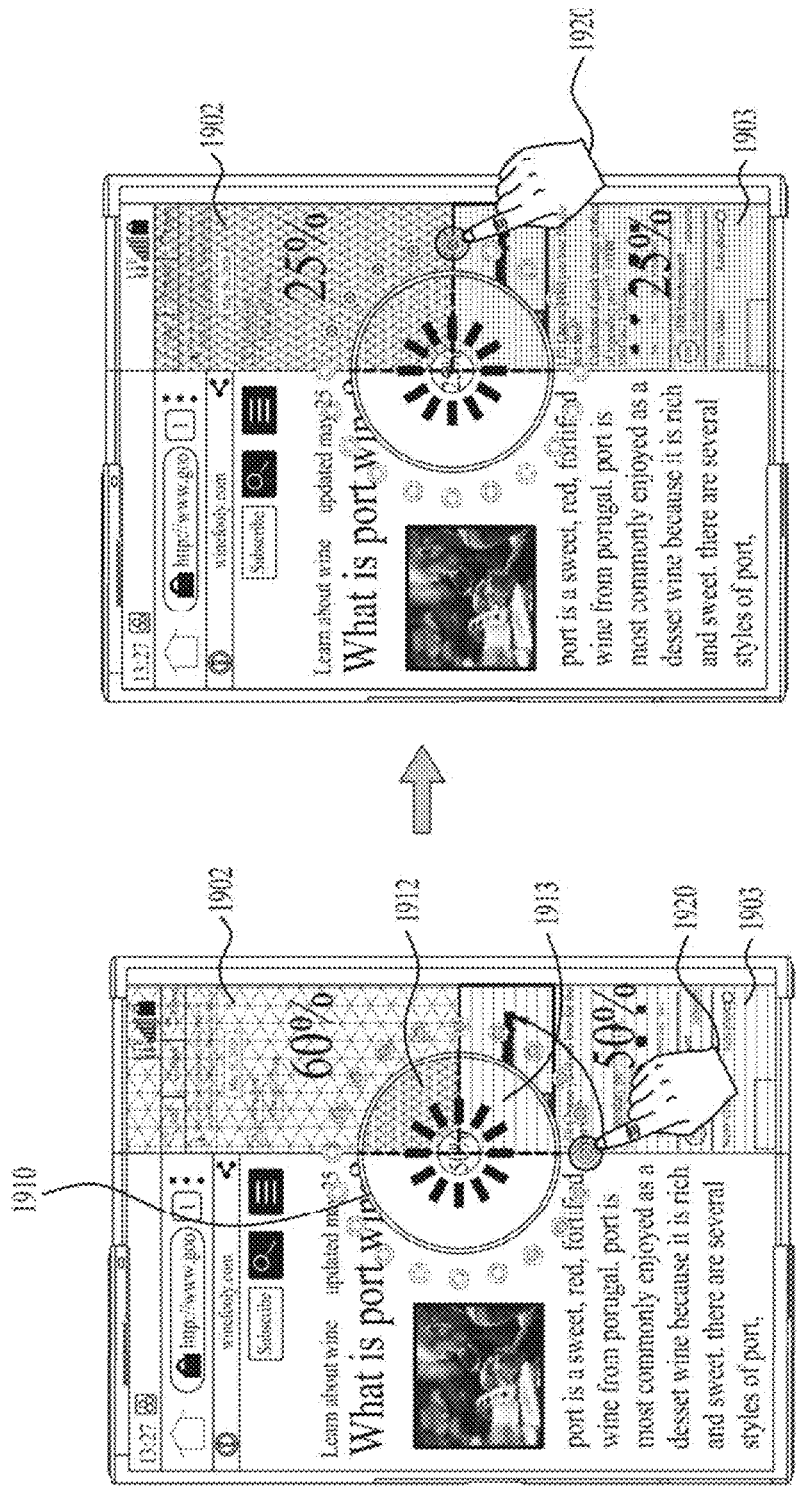
FIG. 19 is a diagram illustrating an embodiment of outputting the same visual effect in a selected region and an inner region of an icon in a mobile terminal according to an embodiment of the present disclosure.

FIG. 19 is a diagram illustrating an embodiment of outputting the same visual effect in a selected region and an inner region of an icon in a mobile terminal according to an embodiment of the present disclosure.

Referring to the left drawing of FIG. 19, when a selected region on the display is determined according to an input signal (not shown) for selecting an icon 1910, the mobile terminal may control output of the same visual effect in the selected region and in an inner region of the icon corresponding to the selected region.

More specifically, when a second region 1912 of the icon 1910 is selected, the mobile terminal may control output of the same visual effect in the second region 1912 of the icon 1910 and in a second application 1902 corresponding to the second region 1912.

Similarly, when a third region 1913 of the icon 1910 is selected, the mobile terminal may control output of the same visual effect in the third region 1913 of the icon 1910 and in a third application 1903 corresponding to the third region 1913.

As the same visual effect, the mobile terminal may output the same color in the second region 1912 and the second application 1902. For example, the mobile terminal may output a first color in the second region 1912 and the second application 1902 and output a second color in the third region 1913 and the third application 1903.

Accordingly, the user may intuitively be aware that an application having the same color as color inside the icon 1910 is controlled based on the icon 1910.

The mobile terminal may detect a first input signal 1920 for controlling a dial indicator of the icon 1910 in a state in which the second region 1912 and the third region 1913 are selected. In a description given below, a function controlled by the icon 1910 may be a brightness adjustment function as an example.

For example, in a state in which the brightness of the second application 1902 is 60% and the brightness of the third application 1903 is 50%, the mobile terminal may detect the first input signal 1920. That is, in a state in which the brightness of the second application 1902 is different from the brightness of the third application 1903, the mobile terminal may detect the first input signal 1920.

Referring to the right drawing of FIG. 19, upon detecting the first input signal 1920, the mobile terminal may control functions of the second application 1902 and the third application 1903 to have the same value.

More specifically, in a state in which the brightness of the second application 1902 is 60% and the brightness of the third application 1903 is 50%, the mobile terminal may detect the first input signal 1920 for controlling the brightness of a selected region to be 25%. The mobile terminal may control the brightness of both the second application 1902 and the third application 1903 to be 25% according to the first input signal 1920.

That is, in the embodiment of FIG. 19, even when the applications have different setting values, the mobile terminal may control the icon 1910 to have the same value.

While the drawings have been separately described for convenience of description, it is also possible to design new embodiments to be implemented by integrating the embodiments described in respective drawings.

Figure 20:
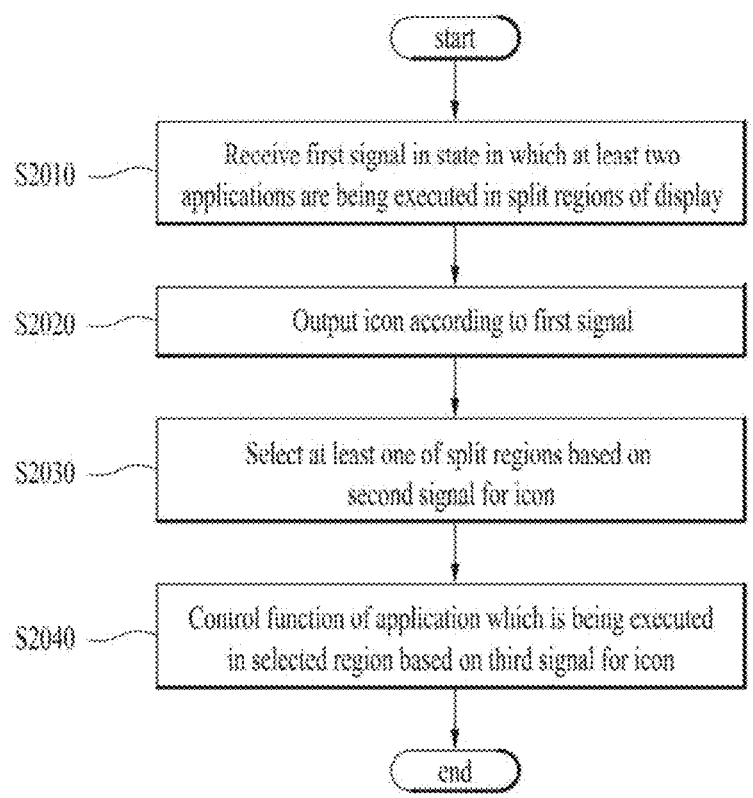
FIG. 20 is a flowchart illustrating an embodiment of controlling a function of an application which is being executed in a split region in a mobile terminal according to an embodiment of the present disclosure.

FIG. 20 is a flowchart illustrating an embodiment of controlling a function of an application which is being executed in a split region in a mobile terminal according to an embodiment of the present disclosure. Each step of FIG. 20 described below may be controlled by the controller of FIG. 1.

The mobile terminal performing a control method of FIG. 20 may include a display coupled to a body so that a display region viewed from a front face of the body is changeable according to switching between an enlarged display mode and a reduced display mode.

In step S2010, the mobile terminal may receive a first signal in a state in which at least two applications are being executed in split regions of the display. That is, the mobile terminal may execute a plurality of applications on the extended display in the extended display mode.

In step S2020, the mobile terminal may output an icon according to the first signal. In this case, the icon may be output in a preset region of the display.

In an embodiment of the present disclosure, the mobile terminal may output a function indicator corresponding to a controlled function inside the icon. In this case, the mobile terminal may change a function controlled by the icon based on a preset signal for the output icon.

In an embodiment of the present disclosure, the mobile terminal may further output a line indicator for distinguishing between split regions inside the icon.

In an embodiment of the present disclosure, the mobile terminal may output a numerical value corresponding to a controlled function inside the icon or on at least one of applications, functions of which are controlled. The mobile terminal may end output of the numerical value after a preset time elapses after the numerical value is output.

In step S2030, the mobile terminal may select at least one of the split regions based on a second signal for the output icon. The mobile terminal may end output of the icon when the second signal is not received within a preset time after the icon is output.

In an embodiment of the present disclosure, when the second signal is a signal for selecting a line indicator, the mobile terminal may determine a region adjacent to the line indicator as the selected region.

In this case, if the mobile terminal determines the selected region among the split regions based on the second signal, the mobile terminal may control the display to distinguishably output the selected region and the remaining regions except for the selected region.

In particular, the mobile terminal may control output of the same visual effect in the selected region and an inner region of the icon corresponding to the selected region.

In step S2040, the mobile terminal may control a function of an application which is being executed in the selected region based on a third signal for the icon. For example, when the selected region is a first region of the extended display, the mobile terminal may control a function of a first application which is being executed in the first region based on the third signal.

In addition, when the selected region is two or more regions, the mobile terminal may simultaneously control functions of applications which are being executed in the two or more regions based on the third signal.

In an embodiment of the present disclosure, a function of an application controlled by the mobile terminal may include at least one of a brightness adjustment function, a sound adjustment function, a screen on/off switching function, a resolution adjustment function, an FPS adjustment function, or a system resource distribution function. However, this is purely exemplary and it is apparent that the function includes all functions of the application which are controllable by the mobile terminal.

In an embodiment of the present disclosure, the third signal may be a signal of touching or touching and dragging a dial indicator which is output together with the icon.

The embodiments described above with reference to FIGS. 10 to 19 may be implemented as the control method of the mobile terminal as illustrated in FIG. 20.

Effects of the mobile terminal according to the present disclosure and the control method therefor are as follows.

According to at least one of the embodiments of the present disclosure, setting of desired regions among multiple split regions may be simultaneously controlled.

According to at least one of the embodiments of the present disclosure, desired setting values of multiple split regions, such as brightness, sound, or resources, may be simultaneously controlled.

The above-described present disclosure may be implemented as computer-readable code on a computer-readable medium in which a program is recorded. The computer-readable medium may be any type of recording device in which data that may be read by a computer system is stored. Examples of the computer-readable medium include a hard disk drive (HDD), a solid state drive (SSD), a silicon disk drive (SDD), a read only memory (ROM), a random access memory (RAM), a compact disc (CD)-ROM, a magnetic tape, a floppy disk, an optical data storage, and a carrier wave (e.g., data transmission over the Internet). The computer may include the controller 180 of the terminal. It will be apparent to those skilled in the art that various modifications and variations may be made in the present disclosure without departing from the spirit or scope of the disclosure. The above detailed description is therefore to be construed in all aspects as illustrative and not restrictive. The scope of the present disclosure should be determined by reasonable interpretation of the appended claims and all changes coming within the equivalency range of the present disclosure are intended to be included in the scope of the present disclosure.

The present disclosure is industrially applicable to a mobile terminal and is repeatedly applicable to the mobile terminal.

What is claimed is:

1. A mobile terminal comprising:
   a body including a first frame and a second frame that is extendable or contractible relative to the first frame;
   a display coupled to the body, wherein a display region viewable from a front face of the body is variable according to switching between an enlarged display mode and a reduced display mode; and
   a controller,
   wherein the display includes a flexible display surrounding the front face, a side face, and a rear face of the body, and
   wherein the controller is configured to:
   operate in the enlarged display mode based on extension of the second frame and operate in the reduced display mode based on contraction of the second frame, control the display to move a display portion positioned on the side face of the body to the front face of the body and move a display portion positioned on the rear face of the body to the front face of the body via the side face of the body, based on the extension of the second frame, control the display to move a display portion positioned on the front face of the body to the side face of the body or to the rear face of the body via the side face of the body, based on the contraction of the second frame, receive a first input in a state in which at least two applications are being executed at split regions of the display;

control output of an icon according to the first input;

control selection of at least a region among the split regions based on receiving a second input corresponding to the icon; and control a function of an application which is being executed at the selected region based on receiving a third input corresponding to the icon.

2. The mobile terminal of claim 1, wherein the controller is further configured to:
determine the at least the selected region among the split regions based on the second input; and
control the display to distinguishably output the at least the selected region relative to remaining regions of the split regions.

3. The mobile terminal of claim 1, wherein the controller is further configured to control a function of a first application which is being executed in a first region based on the third input when the selected region is the first region.

4. The mobile terminal of claim 1, wherein the third input is a touch input or a touch-and-drag input of a dial indicator output together with the icon.

5. The mobile terminal of claim 1, wherein the function of the application being executed at the selected region includes at least one of a brightness adjustment function, a screen on/off switching function, a resolution adjustment function, a frames-per-second (FPS) adjustment function, or a system resource distribution function.

6. The mobile terminal of claim 1, wherein the controller is further configured to control output of a function indicator associated with the controlled function inside the icon.

7. The mobile terminal of claim 1, wherein the controller is further configured to control change of a function controlled by the icon based on a fourth input corresponding to the icon.

8. The mobile terminal of claim 1, wherein the controller is further configured to control output of a line indicator for distinguishing between the split regions inside the icon.

9. The mobile terminal of claim 8, wherein the second input is an input for selecting the line indicator and the controller is further configured to determine a region adjacent to the line indicator as the selected region based on the second input.

10. The mobile terminal of claim 9, wherein, when the at least the selected region includes two or more regions, the controller is further configured to simultaneously control functions of applications which are being executed in the two or more regions based on the third input.

11. The mobile terminal of claim 1, wherein the controller is further configured to control output of a numerical value associated with the controlled function inside the icon.

12. The mobile terminal of claim 1, wherein the controller is further configured to control output of a numerical value associated with the controlled function on the application being executed at the selected region.

13. The mobile terminal of claim 12, wherein the controller is further configured to end the output of the numerical value after a preset time elapses after the numerical value is output.

14. The mobile terminal of claim 1, wherein, when the selected region is determined based on the second input, the controller is further configured to control output of a same visual effect at the selected region and at an inner region of the icon corresponding to the selected region.

15. The mobile terminal of claim 1, wherein the icon is output at a preset region of the display.

16. The mobile terminal of claim 1, wherein the controller is further configured to end the output of the icon when the second input is not received within a preset time after the icon is output.

17. The mobile terminal of claim 1, further comprising a driver configured to extend or contract the second frame.

18. A method of controlling a mobile terminal including a display coupled to a body including a first frame and a second frame that is extendable or contractible relative to the first frame, wherein a display region viewable from a front face of the body is variable according to switching between an enlarged display mode and a reduced display mode, and wherein the display includes a flexible display surrounding the front face, a side face, and a rear face of the body, the method comprising:

operating in the enlarged display mode based on extension of the second frame and operating in the reduced display mode based on contraction of the second frame;

controlling the display to move a display portion positioned on the side face of the body to the front face of the body and move a display portion positioned on the rear face of the body to the front face of the body via the side face of the body, based on the extension of the second frame;

controlling the display to move a display portion positioned on the front face of the body to the side face of the body or to the rear face of the body via the side face of the body, based on the contraction of the second frame;

receiving a first input in a state in which at least two applications are being executed at split regions of the display;

outputting an icon according to the first input;

selecting at least a region among the split regions based on receiving a second input corresponding to the icon; and controlling a function of an application which is being executed at the selected region based on receiving a third input corresponding to the icon.

* * * * *